United States Patent
McCall et al.

(10) Patent No.: US 7,856,153 B2
(45) Date of Patent: Dec. 21, 2010

(54) DISPLAYING A LONG SEQUENCE OF IMAGES IN A SHORT AMOUNT OF TIME

(75) Inventors: Kim McCall, Menlo Park, CA (US); Kurt Piersol, Campbell, CA (US); John Barrus, Menlo Park, CA (US); Bradley Rhodes, Mountain View, CA (US); Stephen Savitzky, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 1221 days.

(21) Appl. No.: 11/346,497

(22) Filed: Feb. 1, 2006

(65) Prior Publication Data

US 2007/0177208 A1    Aug. 2, 2007

(51) Int. Cl.
G06K 9/36    (2006.01)
G06K 15/00    (2006.01)

(52) U.S. Cl. .................................. 382/284; 358/1.18
(58) Field of Classification Search .................. 382/284, 382/282, 293, 298, 305; 358/1.16, 1.17, 358/1.18, 403
See application file for complete search history.

(56) References Cited

U.S. PATENT DOCUMENTS

| | | | |
|---|---|---|---|
| 5,666,208 A * | 9/1997 | Farrell et al. ................. | 358/296 |
| 6,486,895 B1 | 11/2002 | Robertson et al. | |
| 6,747,680 B1 | 6/2004 | Igarashi et al. | |
| 7,194,696 B2 * | 3/2007 | Mori ........................... | 715/783 |
| 7,315,389 B2 * | 1/2008 | Kuwata et al. .............. | 358/1.15 |
| 7,342,569 B2 | 3/2008 | Liang et al. | |
| 7,519,906 B2 | 4/2009 | Balabanovic et al. | |
| 2007/0031035 A1 | 2/2007 | Hovden | |

FOREIGN PATENT DOCUMENTS

| | | |
|---|---|---|
| EP | 1315064 | 5/2003 |
| EP | 1395019 | 3/2004 |
| WO | WO 99/48241 | 9/1999 |
| WO | WO 02/063847 | 8/2002 |
| WO | WO 2004/066536 | 8/2004 |

OTHER PUBLICATIONS

European International Search Report for European Appln No. 07101574.7-2218, mailed Sep. 28, 2007 (7 pages).

Igarashi et al., "Speed-Dependent Automatic Zooming for Browing Large Documents", UIST 00. Proceedings of the 13th. Annual ACM Symposium on User Interface Software and Technology, San Diego, Ca, Nov. 5-8, 2000, New York, NY, ACM, Nov. 5, 2000, pp. 139-148, XP001171601, ISBN: 1-58113-212-3.

(Continued)

*Primary Examiner*—Yon Couso
(74) *Attorney, Agent, or Firm*—Blakely, Sokoloff, Taylor & Zafman LLP

(57) ABSTRACT

A method and apparatus is disclosed herein for displaying a long sequence of images in a short amount of time. In one embodiment, the method comprises selecting page images for display from a plurality of page images corresponding to an image-based document, the plurality of page images including merged page images and each merged page image having salient content from multiple successive page images of the image-based document merged into one image; and serially displaying the selected page images on a display.

32 Claims, 19 Drawing Sheets

OTHER PUBLICATIONS

Sun et al., "Flipper: A New Method of Digital Document Navigation", Internet Citation, Apr. 2, 2005, XP007902934, URL: http://www.cs.umd.edu/{francois/papers/flipper.pdf>, 4 Pages.

J. Savage, "Speed-Dependent Automatic Zooming", Honours Report Computer Science Department Christchurch, Dec. 31, 2002, XP002342647, 28 Pages.

European Search Report for EP Appln No. EP 07101195, mailed May 30, 2007 (6 pages).

"Discrete Fourier Transform" <http://mathworld.wolfram.com/DiscreteFourierTransform.html>, 2009.

\* cited by examiner

DISPLAYING A LONG SEQUENCE OF IMAGES IN A SHORT AMOUNT OF TIME

RELATED APPLICATIONS

This application is related to co-pending U.S. patent application Ser. No. 11/346,493, filed on Feb. 1, 2006, entitled "Compensating for Cognitive Load in Jumping Back," assigned to the corporate assignee of the present invention; U.S. patent application Ser. No. 11/346,856, filed on Feb. 1, 2006, entitled "Enhancing Accuracy of Jumping by Incorporating Interestingness Estimates," assigned to the corporate assignee of the present invention; and U.S. patent application Ser. No. 11/346,498, filed on Feb. 1, 2006, entitled "Avoiding Disorientation under Discontinuous Navigation in an Image Flipping System," assigned to the corporate assignee of the present invention.

FIELD OF THE INVENTION

The present invention relates to the field of displaying images and image processing; more particularly, the present invention relates to displaying sequences of images quickly while preserving recognizability.

BACKGROUND OF THE INVENTION

Physically paging through a large paper document is a process well-known to individuals. One generally twists the edge of the document, allowing the thumb to let the pages freely open in sequence. Depending on the twisting and thumb force applied, the pages either open slowly or quickly. One can quickly move to any spot in the document this way, and see each page in order at whatever speed is desired. There are no limits to the speed used, other than one's own ability to process information. If someone has made an annotation on a page of that paper document, in an ink of contrasting color, the annotations are often easy to see and find even when casually flipping through the document at very high speed.

In the electronic arena, the electronic analogue to flipping pages of a document is scrolling of documents using some type of scroll bar, which is well known in the art. For example, one usually acquires control of a thumb bar using a pointing device (e.g., a mouse). When the thumb bar is moved, pages from the document are displayed by choosing the page that correlates to the current thumb bar position and displaying it. Once the display of one page is complete, the process is repeated. If the thumb bar is moved slowly enough, then every page can be seen. Typically, though, if the thumb bar is traversed quickly, only a small subset of the pages is displayed. There are alternatives to these electronic systems. Some allow the user to view an array of page thumbnails. Such systems work well for a small number of pages, but scale poorly for large documents.

Clearly, for navigating by visual appearance and recognition, the current electronic systems are vastly inferior to the physical process. One can easily miss important pages, and one gains little sense of the document's contents or structure during the navigation process.

Of course, there are many problems that prevent electronic systems from emulating the experience of paper. One key problem is "display refresh rate." The hardware display system of an electronic device repaints its image at some fixed rate. A typical computer display can only refresh about 60-80 times per second. This constitutes an upper limit on how frequently the image on a display device can be changed.

Furthermore, in order to render any image on a display device, some (usually software) component of the system must arrange to place the image in the device's "display buffer." If the image must be retrieved from a disk or composed on the fly from some symbolic format, it may take longer to produce and place in the display buffer than the refresh rate of the display. This "system frame rate" may impose another, more stringent, limit on the speed at which a display device can show a series of images.

Thus, both the display rate and the system frame rate seem to impose limits on how rapidly a user can scan through a document without "skipping" some of its pages. This is, indeed, how a DVD player or VCR plays faster than its standard speed, by skipping many frames. But skipping pages in a document a user is scanning through is a very bad idea, since one is likely to miss the feature for which the search is being performed.

The VCR, DVR, or DVD system, or, somewhat more remotely, an audio tape or CD audio system, allows performing a fast forward operation. Most such systems simply stop where they are when the user tells them to stop. There are Tivo systems that do make an effort to jump back to the point at which the user wanted to stop. Since these systems allow fast-forwarding at different speeds, they do jump back different amounts depending on the speed at which they had been running forward.

There are systems that perform a fast forward operation that automatically stops. An example of such a system is a television program playback system. In a television program playback system, when to stop scanning forward to skip commercial advertisements is controlled by changes in chroma balance, which signal the end of a commercial and the resumption of the desired program material.

Image-based document analysis systems perform similar functions. In this field, systems analyze images to find patterns and try to infer structure. Such inferred structure can then be used to aid navigation or to help users find images or documents of interest. Feature-oriented systems exist that help users recognize previously seen documents or images by refining search.

The problem of aiding navigation by providing the user of a page- or image-oriented system some kind of information to help orient the individual as to where the current focus is within the surrounding context is not new. Indeed much work has been done on such "focus and context" supporting systems within the Human-Computer Interaction research and development communities. But such systems perform this function by displaying some kind of overview within which the user can understand the context of the focused page or image.

Information visualization systems discover similarities in underlying data and try to present them visually in such a way that the user (rather than the system) can distinguish patterns or interesting phenomena.

SUMMARY OF THE INVENTION

A method and apparatus is disclosed herein for displaying a long sequence of images in a short amount of time. In one embodiment, the method comprises selecting page images for display from a plurality of page images corresponding to an image-based document, the plurality of page images including merged page images and each merged page image having salient content from multiple successive page images of the image-based document merged into one image; and serially displaying the selected page images on a display.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
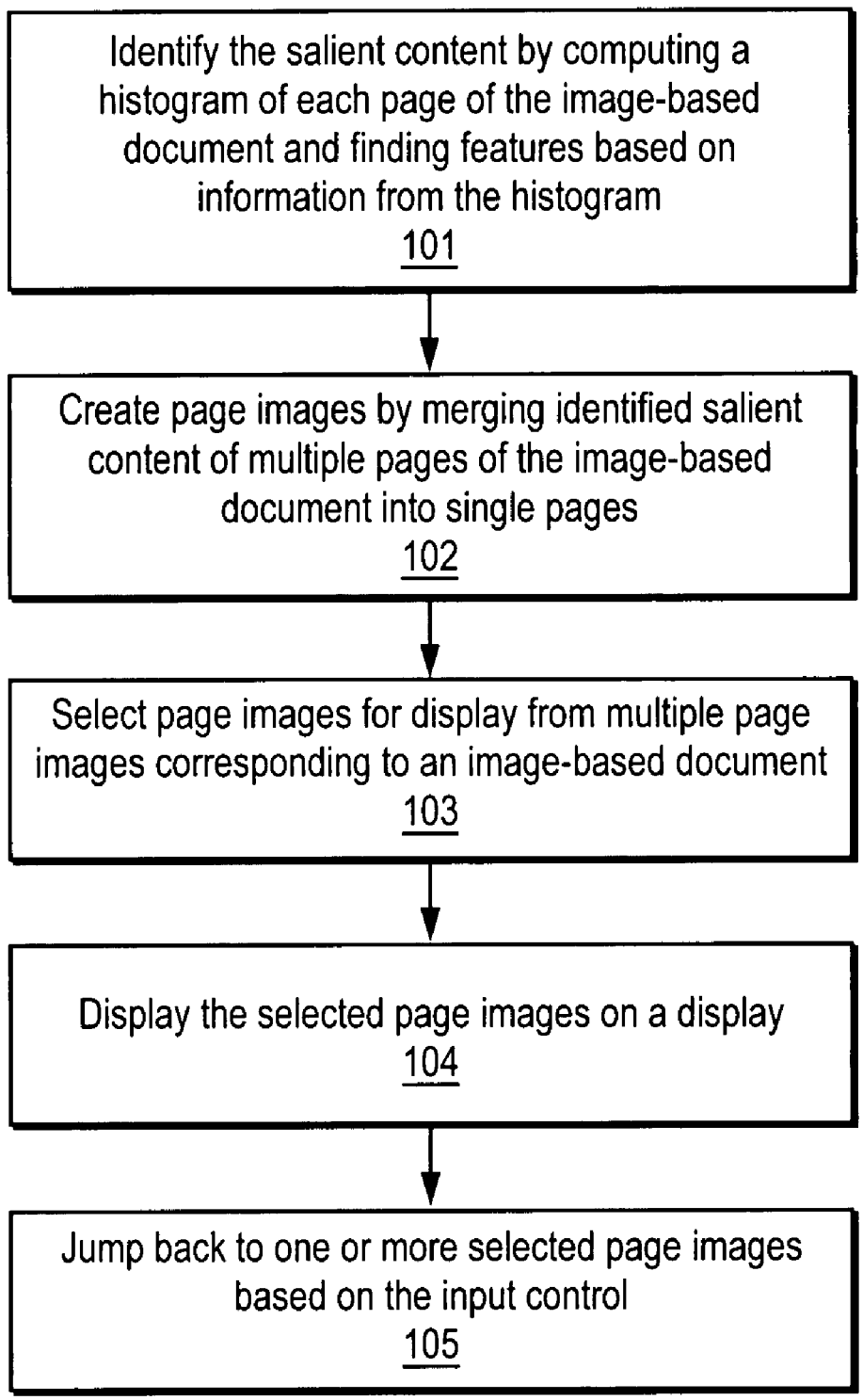
FIG. 1 is a flow diagram of one embodiment of a process for displaying images.

A method and system for viewing, exchanging and manipulating electronic documents is described. In one embodiment, a display system can rapidly display the contents of a large document. The speed at which the pages are displayed may approach a thousand per second. In one embodiment, this is accomplished by combining multiple pages into a single page image. For example, the system may combine, or merge, a group of 16 pages into a single image. The merged image has preserved distinctive content of the pages, along with the general layout of the pages that were merged. The distinctive, or salient, content includes recognizable features. Easily recognizable features include, for example, pictures, charts, tables, chapter headings, section boundaries, index tabs, hand-drawn annotations, etc. For purposes herein, these salient (e.g., prominent, eye-catching, easily recognized) features will be referred to herein as "document landmarks." These salient contents are noticeable to a user when scanning quickly through multiple groups of pages. This may be facilitated by displaying pages at a smooth and predictable rate. In one embodiment, in such a system each and every page will be made visible during the page navigation process.

Page images may be annotated by a user when displayed. In one embodiment, the method of annotation allows marks to be easily found during rapid navigation.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview of Merged Page Display

A system for displaying rapidly the pages of documents in such a way as to provide a paper-like experience is described. The system performs segmentation on pages of the document to identify salient, landmark features. These features from multiple pages are merged onto single page images. The system displays these "merged page images" that contain the landmarks and only some of the ordinary text of several consecutive pages.

In one embodiment, there are multiple sets of merged page images. For example, one set may be where each page image includes merged salient content from two pages. Another set includes merged pages images with merged salient content from four pages, and another set for merging 8, and another set for merging 16, etc. Thus, in one embodiment, merged page images are enhanced to emphasize document landmarks and de-emphasize ordinary text.

Displaying such merged images enables us to overcoming refresh rate and frame rate limitations. To illustrate, if the combined hardware/software system is capable of rendering and displaying thirty page-sized images per second, the user is able to speed through 120 pages per second by composing thirty merged images, each of which contains the salient content of four consecutive pages. In one embodiment, the speed in which the page images are being displayed controls which set is displayed. As speed of traversing the images increases, the page images being displayed represent a greater number of merged pages.

In one embodiment, hand-drawn annotations are combined with the merged images as they are displayed. Alternatively, the annotations are merged with the identified salient content features to be part of the merged images. In either case, such annotations are displayed.

In one embodiment, the user controls the speed and direction of navigation. This may be through a user input device such as, for example, a shuttlewheel.

When the user stops in the middle of rapid scanning, the system attempts to "jump back" to the page that it concludes as the location the user intended to stop (e.g., the image that probably caught the user's attention).

FIG. 1 is a flow diagram of one embodiment of a process for displaying images. The process is performed by processing logic that may comprise hardware (e.g., circuitry, dedicated logic, etc.), software (such as is run on a general purpose computer system or a dedicated machine), or a combination of both.

Referring to FIG. 1, the process begins by identifying salient content on pages of the image-based document (processing block 101). In one embodiment, processing logic identifies the salient content by computing a histogram of each page of the image-based document and finding features based on information from the histogram.

After the salient content on the pages of the image-based document have been identified, processing logic creates page images by merging identified salient content of multiple pages of the image-based document into single pages (processing block 102).

Once the merged pages have been created, processing logic selects page images for display from multiple page images corresponding to an image-based document (processing block 103). The multiple page images include merged page images, and each merged page image has salient content from multiple successive page images of the image-based document merged into one image.

In one embodiment, selecting the page images for display is performed by selecting a subset of the page images based on control information (e.g., a user input) indicative of a rate at which the selected page images are to be serially displayed. In one embodiment, the page images include a first set of merged page images having salient content from a number of page images of the image-based document merged into one image and a second set of merged page images having salient content from a different number of page images of the image-based document merged into one image. Furthermore, in one embodiment, processing logic selects the page images for display by selecting the first set of merged page images if the speed, or rate, at which the document is to be displayed is at one rate and selecting the second set of merged page images if the rate at which the document is to be displayed is at a different rate.

After selecting the page images, processing logic serially displays the selected page images on a display (processing logic 104). Serially displaying selected merged page images enables the document to be scanned at a speed exceeding a refresh rate of the display. The selected page images are displayed in an order, in either a forward or reverse (backward) direction.

While serially displaying the selected page images, processing logic may jump back to one or more selected page images based on the input control (processing logic 105). Processing logic may jump back to a page image based on an interestingness measure associated with the page image.

Note that the following will be described in terms of pages of a document. However, the page images need not come from a document. For example, the pages may be images of a number of files or a stack of documents. Those techniques described herein may be used to perform a search of a number of files, such as searching a hard drive, for specific content.

Page Segmentation

To facilitate the rapid navigation, merged page images are created with the salient content, or landmarks. Initially, prior to merged page image creation, the system identifies document landmarks. In one embodiment, this is done in real time when the document is being displayed. In another embodiment, identification of landmarks occurs off-line before the document is being displayed. The segmentation process is performed for every document that is to be displayed rapidly.

Thus, efficient techniques for such segmentation, as well as a good characterization of what constitutes a landmark in a given document, are valuable.

Figure 2:
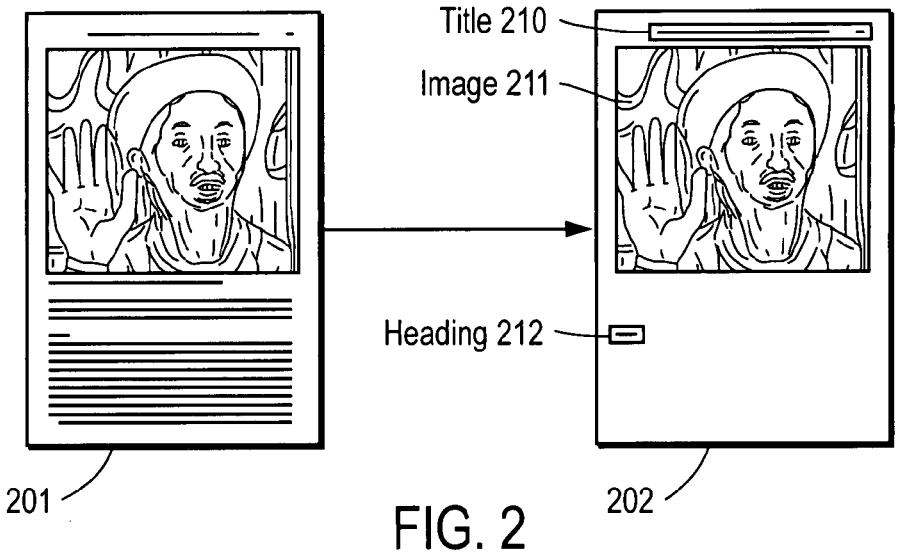
FIG. 2 illustrates the identification of salient content of a page.

FIG. 2 illustrates the identification of salient content of a page. Referring to FIG. 2, a document 201 is shown having an image. As a result of the segmentation process, shown in document 202, the salient content of the page has been identified as title 210, image 211 and heading 212.

Figure 3:
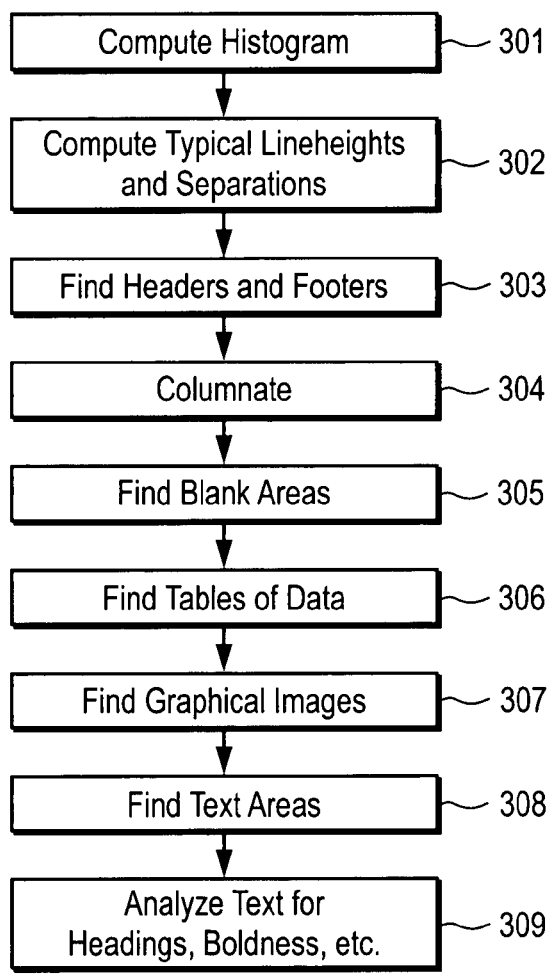
FIG. 3 is a flow diagram of one embodiment of a process for performing segmentation to identify the salient content of a page.

There are a number of segmentation techniques that may be used. In one embodiment, segmentation is based on a horizontal histogram of each page. FIG. 3 is a flow diagram of one embodiment of a process for performing segmentation to identify the salient content of a page. In one embodiment, this process is performed on each page of a document and the salient content identified may be subsequently included in merged page images. The process is performed by processing logic, which may comprise hardware (e.g., circuitry, dedicated logic, etc.), software (such as is run on a general purpose computer system or a dedicated machine), or a combination of both.

Figure 4:
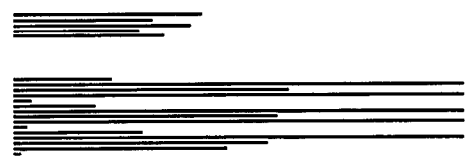
FIG. 4 illustrates an example of a histogram.

Referring to FIG. 3, the process begins by processing logic computing a histogram for the page (processing block 301). In one embodiment, the histogram is a horizontal histogram that may be considered a tally of all the non-background pixels in each scan line of a page image. This is essentially image shifting of all the black dots on a white background page all the way to the left. One such histogram is shown in FIG. 4. Referring to FIG. 4, a bar graph for each scan line is used. The bars start at the left and extend towards the right. In one embodiment, the bars are only one pixel high but most would be fairly close to the length of their neighbors above and below. However, the bars representing those scan lines that fell between lines of text would have length zero.

After computing the histogram, processing logic computes the heights of contiguous blocks of non-zero-length histogram bars (usually the total font height for line of the text on the page) and the separations between such lines of text (processing block 302). After computing the lineheights and separations, processing logic finds headers and footers (processing block 303), finds columns (processing block 304), finds blank areas (processing block 305), finds tables of data (processing block 306), finds graphical images (processing block 307), and finds text areas (processing block 308). Then processing logic also analyzes text for headings, boldness, indentation, justification, line heights, line separation, centering, etc. (processing block 309).

In other words, by examining the histogram, distinctive "signatures" of pictures and other graphics and tables of data may be identified. For example, looking at the page as a whole and during the typical breadth of connected areas (bands without any blank area), paragraphs in the plain text may be identified. Furthermore, knowing that the histogram corresponds to the top of a page, the absence of a bar may indicate that the first bar at the top of histogram refers to some type of header and the remainder of the bars correspond to plain text. To identify chapter and section headings, bold lettering and centered text is detected. This involves exploring the pixels on each line of text. If a line is centered or is mostly bold, in one embodiment, it is considered a heading. The comparisons may be made by looking at the width of every transition between black and white and comparing it to the typical one on the page.

Note that other segmentation routines may be utilized. These include super efficient or parallelized (retinal) algorithms.

Document Representation

In one embodiment, merged pages are computed based on a set of consecutive pages. There are several ways to represent the results of page segmentation that expedite the display of merged page images. In one embodiment, landmarks identified from page segmentation are incorporated into page images, each of which represents multiple pages merged together. These landmarks become enhanced on the combined page images.

In one embodiment, merged images are pre-computed and stored. This includes all the merged images the system is likely to require for any given document. This probably imposes the least demands on the system at display time.

In one embodiment, merged images may be the result of merging two, four, eight, etc. pages up to a value (e.g., a power of two) such that there are about 12 merged images at that level. Thus, in representing a 500 page book, images that represent the merging of 32 pages each are computed (as well as merges of 2, 4, 8, and 16 pages each). These sets of merged images having images representing a different number of merged pages are used by the system based on how slow or fast a user is navigating through a document. If a user is navigating slowly, the set having images representing two pages may be used, while if a user is navigating rapidly, the set having images representing 16 pages may be used. Depending on the size of the document, merged images may be computed for as many as 64 consecutive pages.

In one embodiment, the process of creating merged images includes initially creating a blank image, taking all the landmark elements discovered during segmentation and painting them onto the blank image. Thereafter, for all the areas that are still blank, yet have some text on any of the pages that are being merged, the system fills those areas with a very washed out or faded version of text that is shown in one of the pages. This makes the landmarks appear enhanced.

Figure 5:
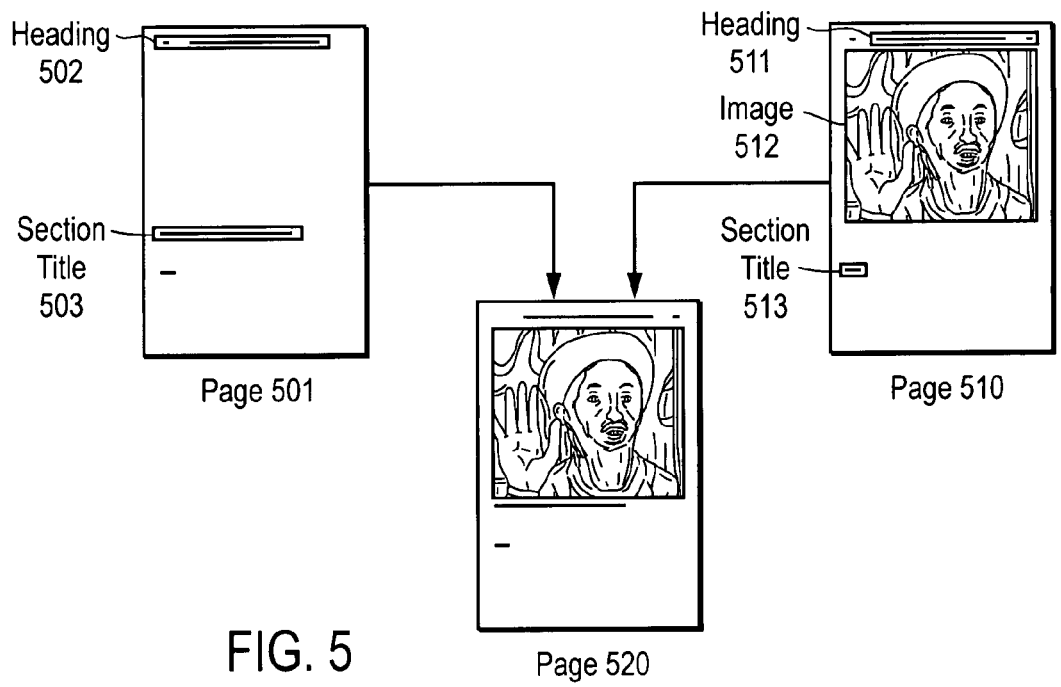
FIG. 5 illustrates the merging process that combines the salient features of multiple pages into a single merged page.

FIG. 5 illustrates the merging process that combines the salient features of multiple pages into a single merged page. Referring to FIG. 5, page 501 has been segmented and the identified salient content of page 501 includes heading 502 and section title 503. Similarly, page 510 has been segmented and the identified salient content includes heading 511, image 512 and section title 513. The salient features of page 501 and page 510 are combined into page 520. Although not visible on page 520, heading 511 of page 510 it is somewhat obscured by heading 502 of page 501.

One complication in handling of landmarks from multiple pages is landmarks that overlap. In one embodiment, the images of overlapping salient content are painted in the order of decreasing area. In this case, the bigger images do not occlude the smaller ones. These images may also be painted with decreasing "alpha values" (i.e., they are painted with increasing transparency).

Figure 6:
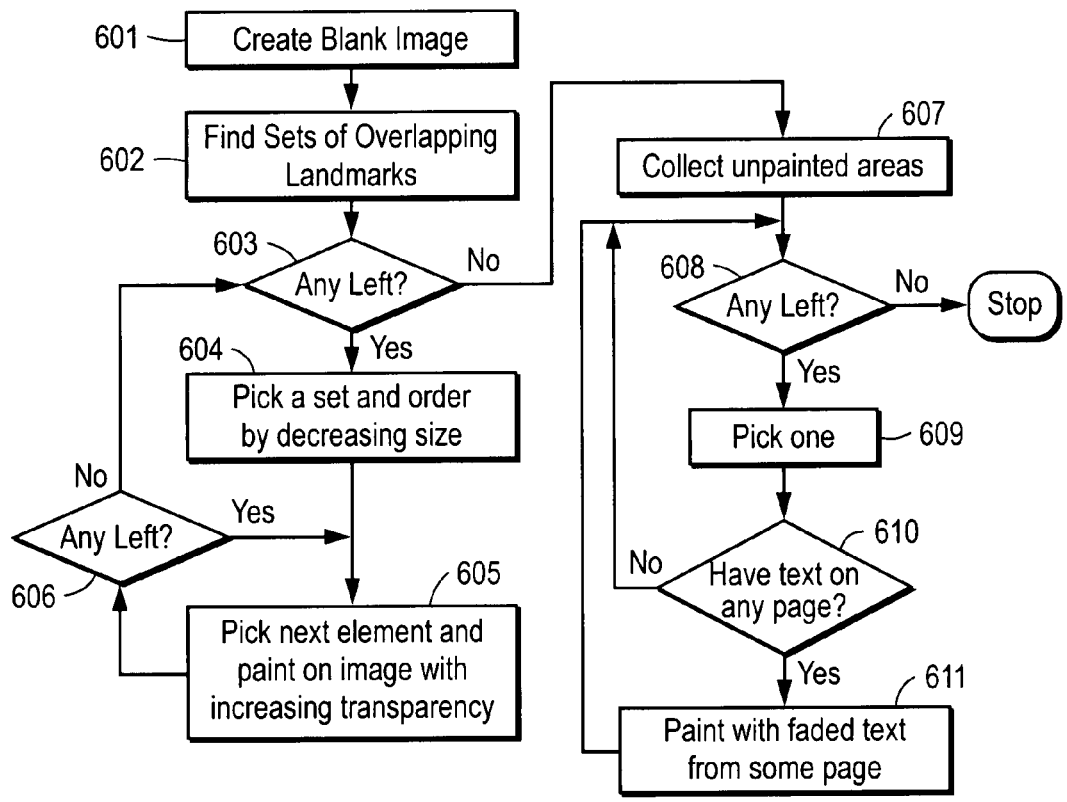
FIG. 6 is a flow diagram of one embodiment of a process for combining the salient features of multiple pages into a single merged image.

FIG. 6 is a flow diagram of one embodiment of a process for combining the salient features of multiple pages into a single merged image. The process may be performed by processing logic which may comprise hardware (e.g., circuitry, dedicated logic, etc.), software (such as is run on a general purpose computer system or a dedicated machine), or a combination of both.

Referring to FIG. 6, the process begins by processing logic creating a blank image (processing block 601). Next, processing logic locates sets of overlapping landmarks in the multiple pages (processing block 602). (Note that a "set" may consist of a single landmark.) Processing logic then determines whether there are any overlapping sets left to process (processing block 603). If so, the process then goes on to process the one or more sets of overlapping landmarks remaining.

More specifically, processing logic selects a set and orders the landmarks in the set by decreasing size (processing block 604). Then processing logic selects the next element from the ordered set and paints the image with increasing transparency, such that those landmarks covering one or more other landmarks are transparent enough to see some portion of the landmarks "beneath" them. (processing block 605). Thereafter, processing transitions to processing block 606 where processing logic determines whether there are any elements remaining in the current set of overlapping landmarks. If so, processing transitions to processing block 605 where the next element is selected and painted on the image. If not, processing logic transitions to processing block 603 where processing logic again tests whether there is any set of overlapping landmarks that remain. If not, processing logic transitions to processing block 607.

At processing block 607, processing logic collects or identifies the unpainted areas of the image. Processing logic tests whether there are any unpainted areas that remain (processing block 608). If not, the process stops. If there are unpainted areas that remain, processing logic iterates through them in an arbitrary order (processing block 609). For each one, processing tests whether there is text on any of the multiple pages being merged that is in that unpainted area (processing block 610). If not, processing logic transitions to processing 608 to continue the iteration. If there is text on any of the multiple pages that are being merged into a single image, processing logic selects one of those pages arbitrarily and paints the unpainted area with a faded version of the text taken from that page (processing block 611), and then processing transitions to processing block 608.

Note, in one embodiment, each of the sets of merged page images is created from a fresh, blank page. For example, when creating a merge page with salient features from four pages, the system does not combine two merge pages each of which contains salient features from two pages. Instead, the system combines the salient features of all four pages onto one new page image.

In one embodiment, the merged images are saved in a defined file hierarchy scheme so that the application responsible for displaying the images is able to locate them.

In order to reduce memory requirements and to speed reading images from the disk when necessary, relatively small thumbnails of merged images may be used. Such thumbnails can be stored at a reduced size and scaled up to full page images when they are displayed as the user scans through the document. Because the images are being displayed so quickly when the user is flipping through pages, the loss of quality from such scaling is likely tolerable.

Another option is to use an image representation like the JPEG2000 image representation scheme to store wavelet and delta information for merged images. Using this representation, the merged images may be built on the fly. This might reduce access to the file system at the expense of processing power.

In another embodiment, the merged images are created dynamically on the fly, including the identification of landmarks.

Control Devices

There are a number of ways of controlling the speed and direction of page scanning or navigating through the sequence of images. In one embodiment, the user knows at any time, without taking his eyes from the page image area of the display, whether scanning is going forwards or backwards. Tactile feedback from the control device is very useful for this purpose. In one embodiment, the user is also able to stop scanning instantly and reliably. In one embodiment, the user is able easily to both sense (ideally both visually and tactilely) and control the rate at which pages are being scanned.

In one embodiment, the user has a high degree of control over the speed of page flipping. This is especially important when the user is near the goal of their search in rapidly navigating an image-based document. That is, as the user nears the goal or page they have just been viewing, in one embodiment, the page flipping that is displayed slows down.

There are two ways to speed up the traversal of a document. First, the time of traversal for a document may be faster by showing more page images more quickly or by showing merged images that represent a greater number of pages. Alternatively, however, if the pages are dense with landmarks, it may be better to show fewer of them at the same time. In one embodiment, a ShuttleXpress controller may be used as the control device. The speed is constantly being monitored as pages are being shown so that when a user lets go of a wheel or as it turns 0, the process automatically jumps back to the approximate page being viewed when the user let it go.

In one embodiment, the system uses a speed control algorithm to control the speed at which the merged images appear. The speed control algorithm processes signals from a speed controller and computes values for direction, merge level (mergeLevel) and rate. MergeLevel refers to herein the number of pages per merged image, and rate refers to herein the number of merged images per second.

Figures 7, 8:
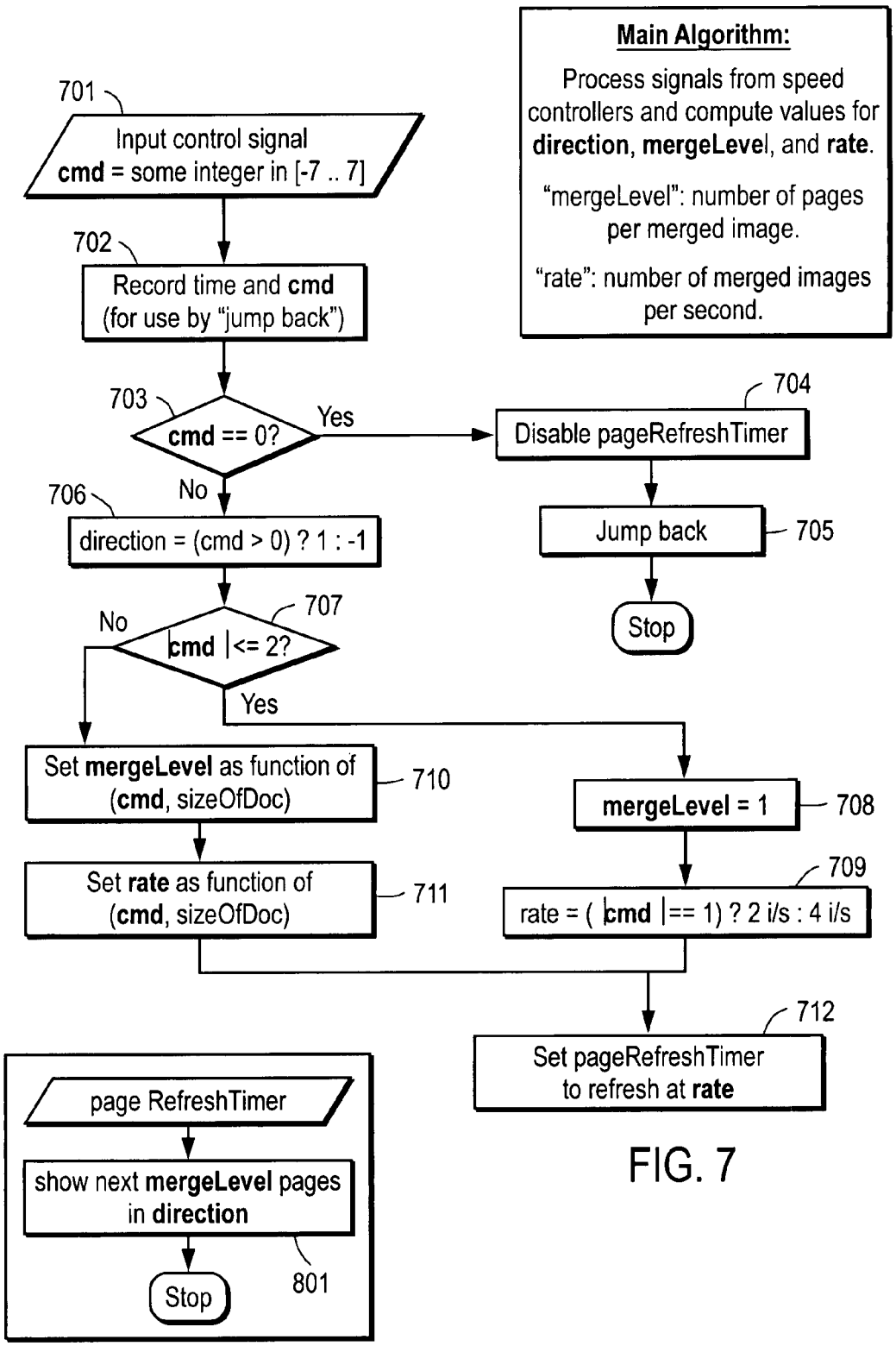
FIG. 7 is a flow diagram of one embodiment of a speed control process.
FIG. 8 is a flow diagram for the control process for the page refresh timer that refreshes the pages shown on the screen.

FIG. 7 is a flow diagram of one embodiment of a speed control process. The process may be performed by processing logic which may comprise hardware (e.g., circuitry, dedicated logic, etc.), software (such as is run on a general purpose computer system or a dedicated machine), or a combination of both.

Referring to FIG. 7, the process begins by processing logic inputting a control signal referred to in FIG. 7 as CMD. In one embodiment, the control signal is an integer between −7 . . . 7 (processing block 701). The range −7 to 7 represents the fifteen positions of a ShuttleXpress controller from Contour Design's of Windham, N. H. The zero position is the "neutral" stopped position.

After inputting the control signal, processing logic records the time and the CMD (for use by a jump back process described later below) (processing block 702). Processing logic then tests whether the CMD is equal to zero (processing block 703). If it is, processing transitions to processing block 704 where the page refresh timer function is disabled and processing logic performs a jump back operation (processing block 705). One embodiment of the jump back process is described in more detail below. The page refresh timer function is described in more detail below as well. After performing a jump back operation, the speed control process ends.

If the input control signal CMD is not equal to zero, processing logic sets the direction equal to one if the input control signal CMD is greater than zero or −1 if the input control signal CMD is not greater than zero. Next processing logic tests whether the absolute value of the input control signal CMD is less than or equal to 2.

Note that the number 2 is chosen because when events were −2, −1, 1 and 2 are received, individual pages are shown rather than merged pages. Thus, outside of that −2 to 2 range, merged pages are shown starting with the small merge amounts and slower frame rates at lower values (−3 and 3) and increasing both when going towards the higher values (−7 and 7). In one embodiment, at the highest values, it is desirable to move through an entire document in under 3 seconds.

If the absolute value of CMD is less than or equal to 2, processing logic sets the mergeLevel equal to 1 (processing block 708) and sets the rate equal to two images per second if the absolute value of the input control signal CMD is equal to 1 or four images per second if absolute value of the input control signal CMD is not equal to 1 (processing block 709), and then transitions to processing block 712. If the absolute value of the input control signal CMD is not less than or equal 2, processing logic sets the mergeLevel as a function of the input control signal CMD and the size of document (SizeOfDoc), (processing block 710), sets the rate as a function of the input control signal CMD and the size of the document (SizeOfDoc) (processing block 711), and transitions to processing block 712. In one embodiment, the size of the document (SizeOfDoc) is a constant determined when the document is first loaded. As mentioned above, the mergeLevel will be higher for larger documents so that at the highest values of CMD the entire document can be traversed in 3 seconds.

At processing block 712, processing logic sets the page refresh timer function to refresh at the rate indicated by the rate variable.

FIG. 8 is a flow diagram for the control process for the page refresh timer that refreshes the pages shown on the screen. The process is initialized (i.e., the values that control it, such as rate, direction, and mergeLevel are established) by the processing logic described above. Referring to FIG. 8, the page refresh processing entails showing the next mergeLevel pages in the direction specified by the direction variable set in the speed control process of FIG. 7 (processing block 801).

Figure 9:
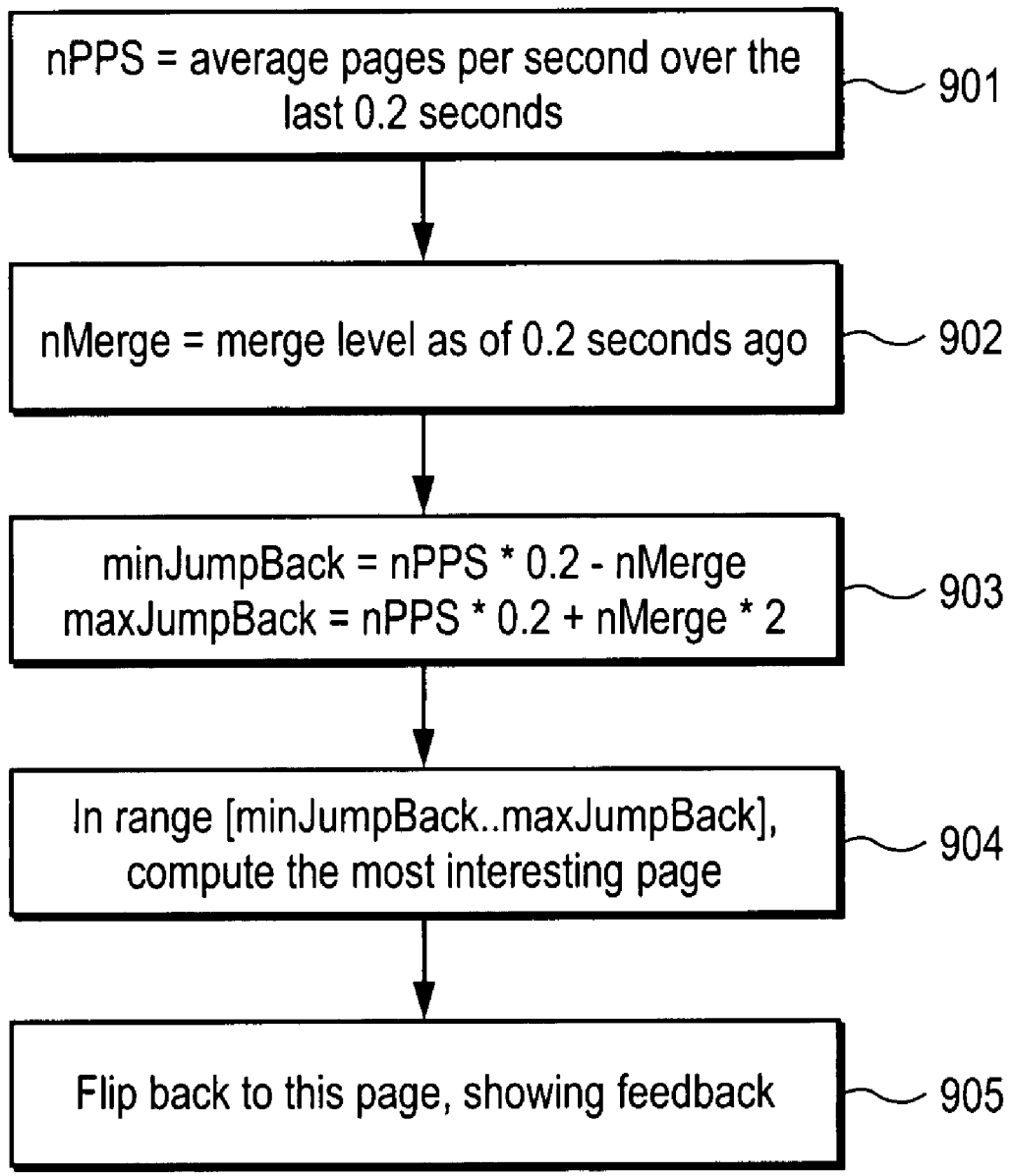
FIG. 9 is a flow diagram of one embodiment of the process for jumping back.

FIG. 9 is a flow diagram of one embodiment of the process for jumping back. The process is performed by processing logic which may comprise hardware (e.g., circuitry, dedicated logic, etc.), software (such as is run on a general purpose computer system or a dedicated machine), or a combination of both.

Referring to FIG. 9, the process begins with processing logic setting the variable nPPS (number of pages per second) equal to the average pages per second over the last 0.2 seconds (processing block 901). Next, processing logic sets the variable nMerge (number of the merge level) equal to the merge level as of 0.2 seconds ago (processing block 902). Processing logic also sets the variable minJumpBack, which refers to the minimum amount to jump back, equal to nPPS multiplied by 0.2 minus the value of the merge level (nMerge) and sets maxJumpBack, which indicates the maximum amount that can be jumped back, equal to nPPS multiplied by 0.2 plus the value of the merge level (nMerge) multiplied by 2. Processing also computes the most interesting page that is in the range between the minimal amount to jump back (minJumpBack) and the maximum amount to jump back (maxJumpBack) (processing logic 904) and then processing logic goes back to this page, showing forms of feedback that will be described below (processing logic 905).

Alternatively, a scroll bar like interface may be used. In such a case, a strip is used along the side of the page display showing the current position within the document. The user may click and hold (the mouse for example) above or below this to move forward or back through the sequence of pages. The speed of the page flipping depends both on the distance of the mouse cursor from the current location and the length of time the user has been holding the mouse. If one were located near the beginning of the document and clicked and held near the end, the page scanning rate would gradually ramp up to full speed until approaching the location near the end where the cursor is being held and then gradually ramping down.

Navigation Feedback

In one embodiment, the system includes multiple forms of feedback to provide an indication to the user at any time whether one is scanning forwards or backwards. At low scanning rates, the system simulates a "page turn" by showing a vertical bar that appears to wipe across the display, revealing the next page. The wipe is right-to-left if scanning forwards and left-to-right if scanning backwards. The system may include an audible flipping sound that varies according to both direction and speed.

In another embodiment, the system automatically slows down scanning as it approaches especially important landmarks, like hand-drawn annotations or separator pages (see below). This may be done only if they are relatively sparsely distributed. These are referred to herein as "speed bumps." Thus, the system assumes that a user will want to see the landmarks clearly.

Examples of System

Figure 10:
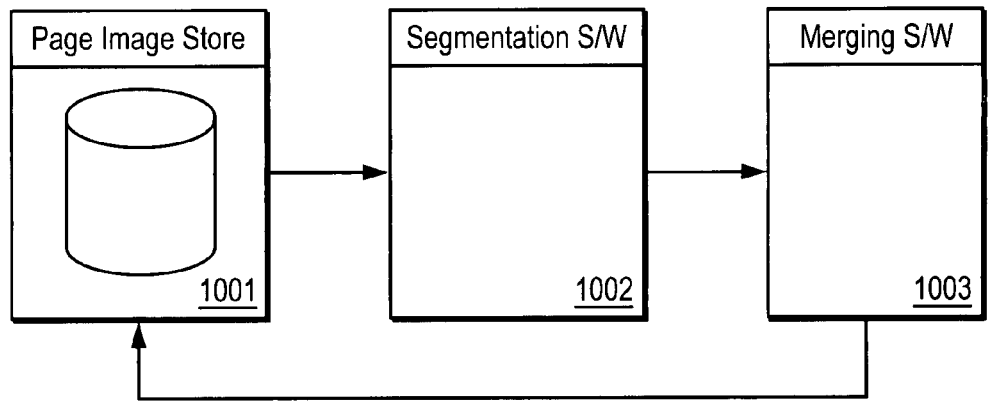
FIG. 10 is one embodiment of a system to perform the segmentation and merging system processes.
Figure 11:
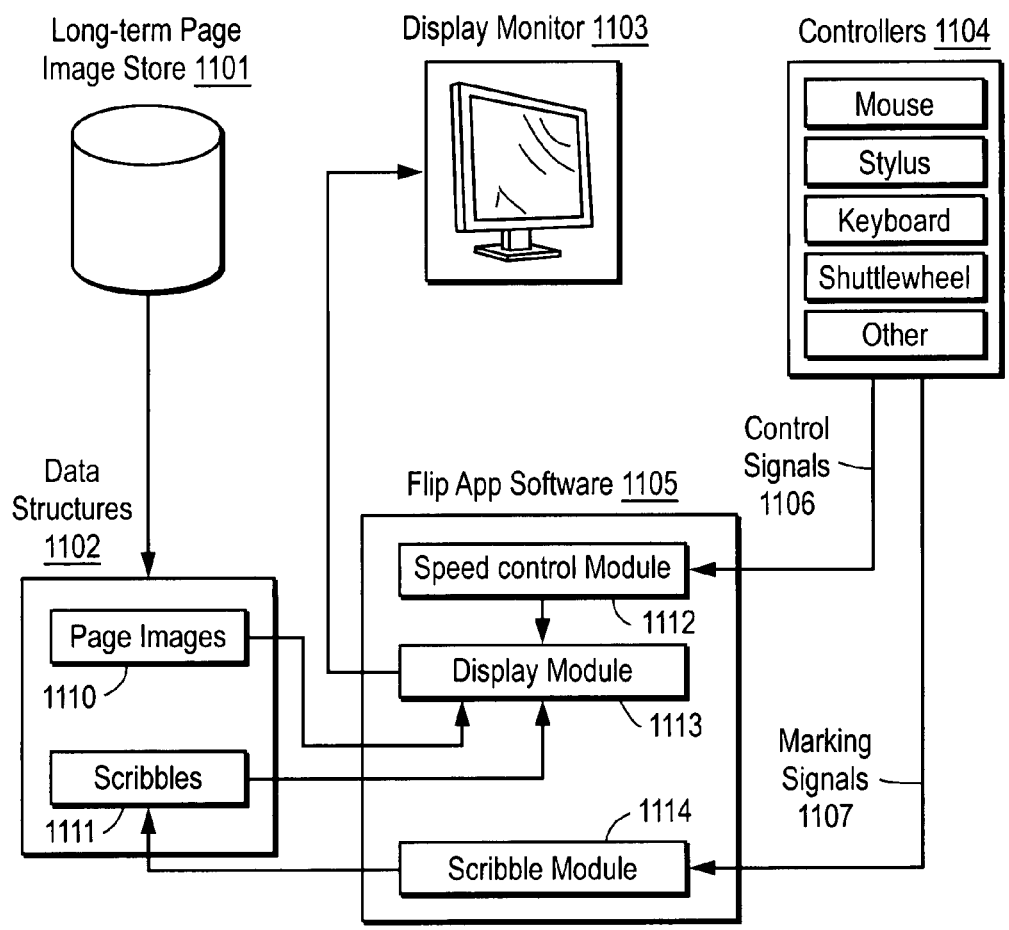
FIG. 11 illustrates the run-time application system portion for displaying the page images.

In one embodiment, the system for rapidly navigating image based documents includes two parts. These parts may be the same system or may represent two separate systems. Examples of these systems are shown in FIGS. 10 and 11. FIG. 10 illustrates a system to perform the segmentation and merging system processes, while FIG. 11 illustrates the run-time application system portion for displaying the page images.

Referring to FIG. 10, the page image store 1001 stores image data. Segmentation software 1002, which may be stored in a memory and executed by a processor, obtains images from the page image store 1001 and performs salient feature identification. The results of the salient feature identification from segmentation software 1002 is sent to merging software 1003, which may be stored in a memory and executed by a processor. Merging software 1003 combines the salient features of multiple pages into a single merged image. The merged images resulting from merging software 1003 are stored back in page image store 1001.

FIG. 11 illustrates the run-time application system block diagram. Referring to FIG. 11, long-term page image store 1101 stores merged images. Long-term page image store 1101 may be the same as page image store 1001 of FIG. 10 or a different memory. There is a further repository of run-time data structures 1102. In one embodiment, data structures 1102 comprise page images 1110 and annotations 1111. Note that it is not necessary to include annotations 1111.

Application software 1105, which may be stored in a memory and executed by a processor, includes a display module 1113 which accesses data structures 1102 and displays page images 1110 and annotations 1111, if any, on display monitor 1103 according to the speed indicated by speed control module 1112. The speed control module 1112 is responsive to control signals 1106 from controllers 1104 to modify the speed of the merged images being displayed. Controllers 1104 may include one or more of a mouse, stylus, keyboard, shuttlewheel or any other well-known controller. The control signals from controller 1104 indicate to speed control module 1112 how fast display module 1113 is to access memory and display merged images. In one embodiment, speed control module 1112 translates a requested velocity into a control of the display. Display module 1113 reads this information from speed control module 1112 to decide how fast to obtain page images (and annotations). Thus, display module 1113 chooses the sets of merged images to display based on speed control from speed control module 1112. Based on those inputs, display module 1113 shows full resolution individual page images or one or more merged page images.

In one embodiment, application software 1105 includes annotation module 1114 that is responsive to marking signals 1107 from controllers 1104. The user uses one of controllers 1104 to create an annotation on an image. For example, a user with a tablet and stylus may want to underline, circle, or otherwise annotate a page. Annotation module 1114 causes the annotation to be stored with page image 1110 corresponding to the page upon which the annotation was made. Display module 1113 accesses the annotation from data structure 1102 when displaying page image 1100 and merges the two together for display. Thus, the stored images of the merged pages are not modified. In one embodiment, whenever a page or merged image is shown, all the marks associated with that page or set of pages are shown as well. In an alternative embodiment, the stored or merged images may be modified to include all the marks associated with the image of the merged pages.

Example Functionality

In one embodiment, the system includes additional functionality. This may include chapter tinting or thumb indexing, ephemeral animations, and ephemeral separation pages.

In one embodiment, to discern different sections of text, like chapters, the system enhances the document's own images by providing visual clues to chapter boundaries. For example, the system might perform chapter tinting by adding different pastel backgrounds to the images of the pages of each chapter. Also, the system might perform thumb indexing by artificially providing chapter thumb indexes analogous to those that some books provide.

In one embodiment, the system provides a facility for a user to insert "flip-book" style animations (ephemeral animations) that announce the importance of some page as it is being approached through rapid scanning. The quasi-annotations of which such an animation would consist would not appear on pages when viewed slowly or statically.

A special-purpose device that embodied the technology described herein might host a number of documents. In one embodiment, the system inserts distinct "separator pages" (ephemeral separator pages) that signal the transition from one document to another, thus avoiding the need for the user to switch to another viewing metaphor to choose among documents to scan.

Compensating for Cognitive Load in Jumping Back to One of Several Rapidly Displayed Image One of the challenges encountered by the navigation system described herein is stopping at an appropriate place as page images of a document are being displayed rapidly. One of the primary uses (along with general browsing) of a rapid image flipping (RIF) system described herein is recognition-based navigation. A user may flip through a document the user viewed previously, looking for some particular "landmark" (e.g., a certain picture, graph, etc.). When the user recognizes that landmark, the user signals the system to stop flipping. It is not at all unthinkable that the user may have been quickly going through the document at 200 pages per second. By the time the user has recognized a landmark and convinced their hand to signal the system to stop, the landmark-containing image will no longer be on the display, and the system will need to do its best to try to jump back to the page the user recognized.

A simple approach to solving this problem posits a standard "reaction time," multiplies this by the speed of page image display, and jumps back that far. However, user reaction time in such a system is itself a function of (among other things) the speed of page image display. One embodiment of the present invention provides a method for incorporating this realization into the behavior of the page scanning system.

The Naive Solution

The amount of time that it takes to recognize that a user wants to stop and to then propagate that decision through the user's neural pathways and into the RIF system is referred to herein as "reaction time." In one embodiment, the "reaction time" also includes the hysteresis the control device possesses that delays its response to the user's signal. If the system can keep track of the image display (flipping) speed, then it can multiply this by the reaction time to find out approximately which page caused the user to signal the system to stop the rapid display of page images. In one embodiment, if the page flipping speed over the course of the reaction time has not been constant, then the system "integrates" the area under the curve" rather than multiplying.

The use of reaction time in this manner, of course, is only an approximate solution, since reaction time is neither constant nor precise enough to distinguish among pages flashing by at 200/sec. However, it provides an idea of where to search to discover an "interesting" page that might have a landmark that the user recognized. The use of interestingness is discussed in further detail below.

A Novel Solution

A method for enhancing the accuracy of the estimate of the "operator-intended stopping point" within a rapid discontinuous or continuous image presentation system incorporates an estimate of the variation of the operator's reaction time due to the rate of image presentation. Knowing the reaction time, we can multiply it by the image flipping rate to decide how far to jump back.

In one embodiment, the RIF system takes into account that reaction time itself is strongly influenced by image flipping rate. Given a fixed set of images, and a fixed "landmark" at which to stop, the reaction time slows down as the speed of image presentation increases. Thus, one embodiment of the RIF system takes this phenomenon into account when trying to jump back to the desired image.

This may be further explained through the use of an example. Assume that the user's reaction time when viewing 25 images per second is 0.125 seconds. Assume that his reaction time slows by 20% for each doubling of the image display rate. (Formally, this is a conservative, assumption, since it is sub-linear.) If the display rate is increased to 200 images per second, his reaction time will degrade by a factor of 1.23 or approximately 1.7. Without factoring in this degradation, the system would compensate for the user's reaction time by jumping back 25 pages (when displaying them at 200/sec). But factoring this in, it will jump back 42 pages. Even if the degradation is as little as 10% per doubling of page speed, the system would need to jump back 33 pages, rather than 25. This is a very significant difference, and a system that fails to take it into account will be experienced as severely lacking.

In order to take the degradation of reaction time into account in jumping back to the desired image, the following formula for distance as a function of rate and time is the starting point.

$$d = r * t \qquad (1)$$

where, d represents the number of images to jump back, r represents the preceding image display rate, and t represents the reaction time. Let us use the subscript p to reflect the person whose reaction time is being represented, since different people have different reaction times.

$$d = r * t_p \quad (2)$$

To incorporate the fact that reaction time, itself, is a function of image flipping speed, the formula is further refined to be:

$$d = r * t_p(r) \quad (3)$$

Analyzing the function $t_p$, any given individual will have some fixed reaction time under minimal cognitive load. This is then augmented by an additional increment of time due to cognitive load. This may be re-written as:

$$t_p(r) = t_p + l_p(r) \quad (4)$$

where $l_p(r)$ is the load-attributable delay for person p at image flipping rate r. Substituting this into equation (3), the following is obtained:

$$d = r * (t_p + l(r)) \quad (5)$$

Rewritten to make more explicit the two terms, only the first of which was accounted for in the naive solution, the following is obtained:

$$d = r * t_p + r * l_p(r) \quad (6)$$

The full nature of the final term of this formula, which represents the degradation of reaction time as cognitive load increases, can be determined by further experimentation. It seems likely to be at least linear. For simplicity, assuming that it is, in fact, a linear function, i.e., that, for any given person, the added delay in reaction time is a linear function of the added speed of image display. Since this is a constant for a given person, it is written as $c_p$. The equation is then written in the interesting form:

$$d = r * t_p + r * c_p * r \quad (7)$$

or $$d = r * t_p + c_p * r^2 \quad (8)$$

The jump-back method, then, uses this formula to compute the distance to go back to find the user's desired image.

The user-specific constants are determined during an initial calibration process. Such a calibration process may include the running of a training phase in which the system receives user feedback and is able to arrive as the constants. Such training is well-known in the art.

Figure 12:
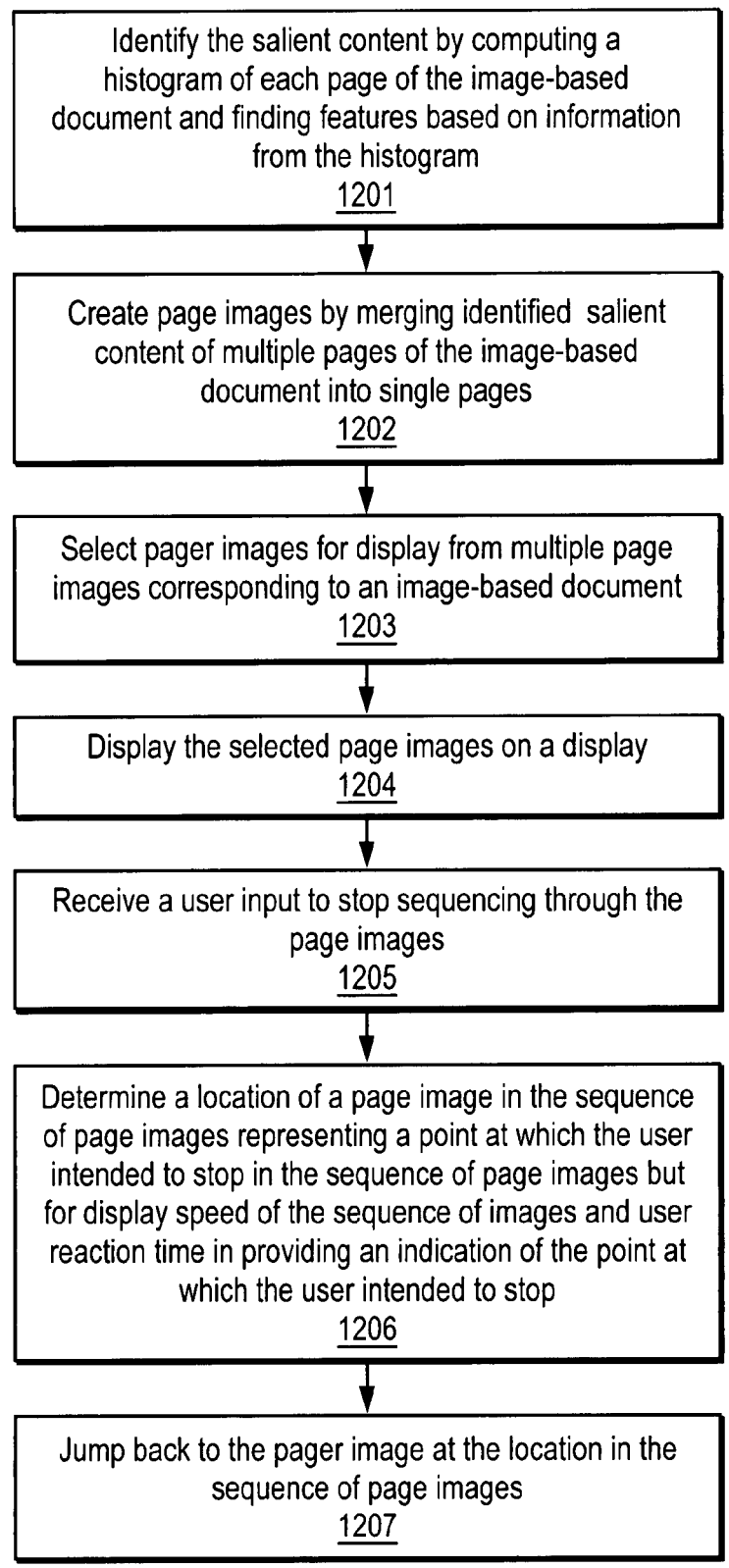
FIG. 12 is a flow diagram of another embodiment of a process for displaying images.

FIG. 12 is a flow diagram of another embodiment of a process for displaying images. The process is performed by processing logic that may comprise hardware (e.g., circuitry, dedicated logic, etc.), software (such as is run on a general purpose computer system or a dedicated machine), or a combination of both.

Referring to FIG. 12, the process begins by identifying salient content on pages of the image-based document (processing block 1201). In one embodiment, processing logic identifies the salient content by computing a histogram of each page of the image-based document and finding features based on information from the histogram.

After the salient content on the pages of the image-based document has been identified, processing logic creates page images by merging identified salient content of multiple pages of the image-based document into single merged pages (processing block 1202).

Once the merged pages have been created, processing logic selects page images for display from multiple page images corresponding to an image-based document (processing block 1203). The multiple page images include merged page images, and each merged page image has salient content from multiple successive page images of the image-based document merged into one image.

In one embodiment, selecting the page images for display is performed by selecting a subset of the pages images based on a control information (e.g., a user input) indicative of a rate at which the selected page images are to be serially displayed. In one embodiment, the page images include a first set of merged page images having salient content from a number of page images of the image-based document merged into one image and a second set of merged page images having salient content from a different number of page images of the image-based document merged into one image. Furthermore, in one embodiment, processing logic selects the page images for display by selecting the first set of merged page images if the speed, or rate, at which the document is to be displayed is at one rate and selecting the second set of merged page images if the rate at which the document is to be displayed is at a different rate.

After selecting the page images, processing logic serially displays the selected page images on a display (processing logic 1204). Serially displaying the selected page images enables the document to be scanned at a speed exceeding the refresh rate of the display. The selected page images are displayed in an order, in either a forward or reverse (backward) direction.

While displaying the sequence of images, processing logic receives a user input to stop sequencing through the page images (processing block 1205).

In response to the user input, processing logic determines a location of a page image in the sequence of page images representing a point at which the user intended to stop in the sequence of page images but for display speed of the sequence of images and user reaction time in providing an indication of the point at which the user intended to stop (processing block 1206). In one embodiment, the location is selected based on the image display rate and the reaction time associated with the user. In another embodiment, the location is selected based on an interestingness measure of a page at the location.

In one embodiment, processing logic selects the reaction time associated with the user from multiple available reaction times based on the image display rate. Selection of the reaction time for the user may include selecting a first reaction time when the image display rate is at one rate and selecting another reaction time when the image display rate is at a second rate different from the first rate. The reaction times may be set as a result of a calibration process. Once the location has been determined, processing logic automatically jumps back to the page image at the location in the sequence of page images (processing block 1207).

Enhancing Accuracy of Jumping Based on Interestingness

Another way to enhance the perceived accuracy of stopping when rapidly flipping among page images is to incorporate "interestingness estimates" for the various pages. In one embodiment, the distinctiveness of each page image is ranked against all other images. Because rapid flipping technology often shows more than one page image at a time, some further way of discovering where the user intended to stop is needed.

Many documents consist of lots of visually boring pages and a few more interesting ones. When scanning rapidly through a document, the user's attention is caught only by the visually interesting pages. Thus, in one embodiment, the system uses the visual distinctiveness of a page to further refine the estimate of where the user intended to stop.

Assuming that the rapidly-flipping user of the system noticed some highly salient feature of some image, once the system has discovered, through reaction time computation, the approximate portion of the document where the user intended to stop, the system compares all the nearby pages to determine which of them was most visually interesting or distinctive. This distinctiveness is based on an "interestingness score" computed by the system for each of the pages. The interestingness may reflect the number and size of pictures, graphs, or tables it contains, the fact that it differs from other pages in the number of columns is has, the fact that it has a centered heading, etc. In one embodiment, based purely on the reaction time estimate, the system creates a simple probability curve among all pages in the range selected based on the reaction time given the likelihood that the user meant to stop on any given page. Finally, the system multiplies the interestingness measures by the probability curve in order to favor interesting pages near the centroid of the pages based on reaction-time over ones further out.

Thus, the techniques described herein discover appropriate images in response to very simple, non-domain-specific feature discovery and weighting to rank images in terms of interestingness or distinctiveness. This could have application in such diverse domains as video playback, information visualization, image-based document analysis, and surveillance and spy systems.

While these techniques are useful in the context of "jumping back" to a user's intended stopping place when viewing, for example, a document by flipping very rapidly among its pages in a forward or backward direction, they are also useful for discontinuous navigation, i.e., in jumping from one part of a document to another without showing the intervening pages.

One such situation arises when the user is flipping quickly through the document and sees a page she wants to stop on. By the time she has signaled the system to stop, she may easily be viewing a page 100 pages removed from the desired stopping point. In returning to what the system guesses to be that stopping point, the user doesn't want to see all the intervening pages again. Again, the user may be near the beginning of a document and want to view something about 80% of the way through. She may wish to jump directly to that region.

Computing Interestingness of a Page

To compute the interestingness of a page, the system identifies features that make a page visually distinctive or an especially good place to stop. Such features may include, for example, having chapter headings; having section headings; number and size of pictures or graphs; number and size of tables; and number of columns.

In one embodiment, another interesting feature is the property of having an unusually large blank area on the preceding page. In many documents, this signals the start of a new chapter or section. The first page of the section may not, in fact, be all that visually distinctive, especially if some neighbor includes a big picture, but the page may yet be an important stopping place. In one embodiment, the system gives each of these features a weighting. This is to recognize that some of these are more important than others, so that a page with a big picture will be seen as more interesting than one with a section heading. Note that the system still wants one with a section heading to stand out from surrounding ones with no interesting features at all.

After weighing each feature, the system rates each page in terms of its variance from the typical page of the document as a whole (or from surrounding pages in the case of a really large document) on each of these features (dimensions). By computing the variance, the system actually allows a visually boring page to stand out within a bunch other pages all of which have lots of pictures.

Finally, the system computes a total page interestingness score by multiplying the score on each dimension by that dimension's weight and summing the products. Note that the interestingness computation is described in more detail below.

Using this total page interestingness score, the system selects the most interesting page within a range of pages selected based on reaction time.

Figure 13:
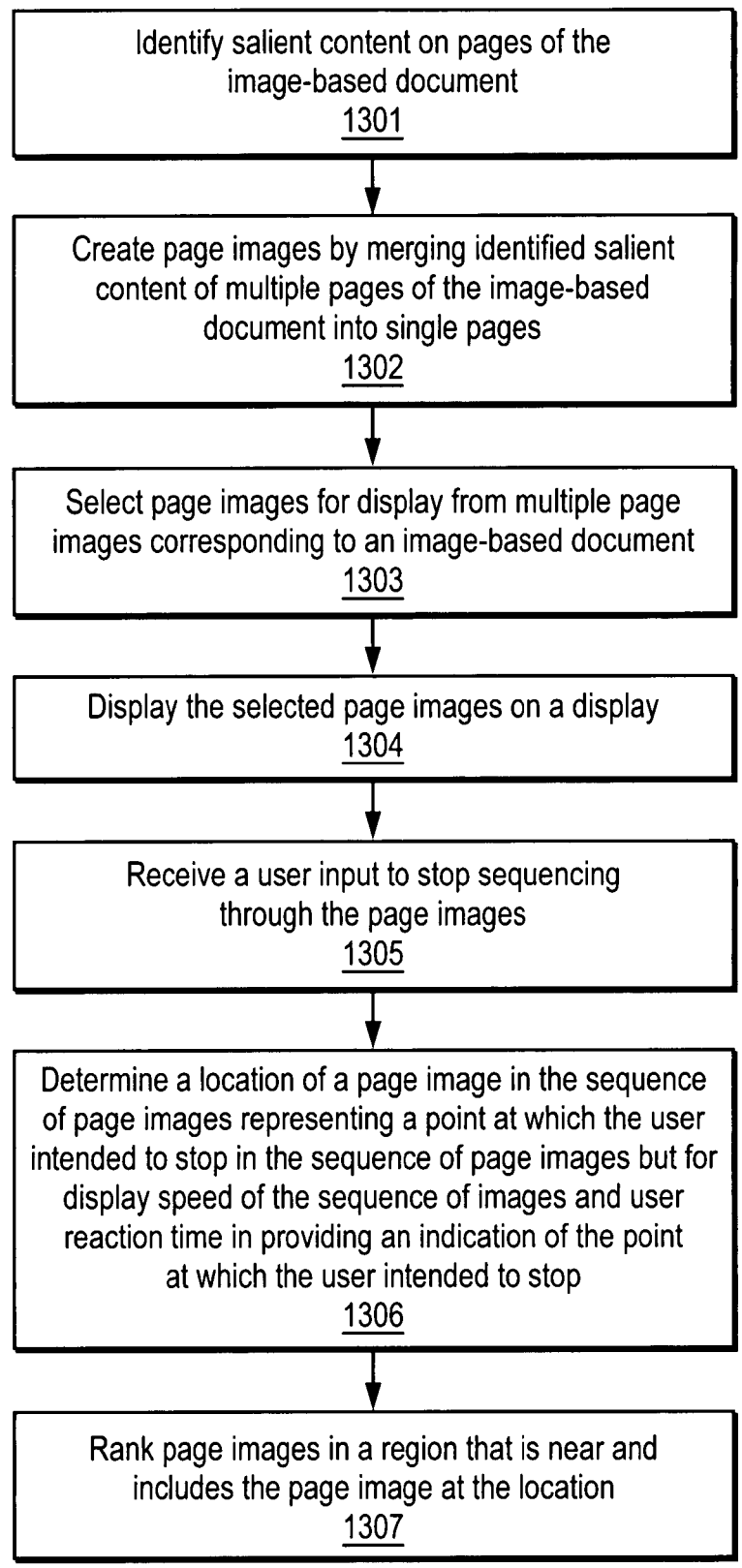
FIG. 13 is a flow diagram of yet another embodiment of a process for displaying images.

FIG. 13 is a flow diagram of yet another embodiment of a process for displaying images. The process is performed by processing logic that may comprise hardware (e.g., circuitry, dedicated logic, etc.), software (such as is run on a general purpose computer system or a dedicated machine), or a combination of both.

Referring to FIG. 13, the process begins by identifying salient content on pages of the image-based document (processing block 1301). In one embodiment, processing logic identifies the salient content by computing a histogram of each page of the image-based document and finding features based on information from the histogram.

After the salient content on the pages of the image-based document has been identified, processing logic creates page images by merging identified salient content of multiple pages of the image-based document into single merged pages (processing block 1302).

Once the merged pages have been created, processing logic selects page images for display from multiple page images corresponding to an image-based document (processing block 1303). The multiple page images include merged page images, and each merged page image has salient content from multiple successive page images of the image-based document merged into one image.

In one embodiment, selecting the page images for display is performed by selecting a subset of the page images based on a control information (e.g., a user input) indicative of a rate at which the selected page images are to be serially displayed. In one embodiment, the page images include a first set of merged page images having salient content from a number of page images of the image-based document merged into one image and a second set of merged page images having salient content from a different number of page images of the image-based document merged into one image. Furthermore, in one embodiment, processing logic selects the page images for display by selecting the first set of merged page images if the speed, or rate, at which the document is to be displayed is at one rate and selecting the second set of merged page images if the rate at which the document is to be displayed is at a different rate.

After selecting the page images, processing logic serially displays the selected page images on a display (processing logic 1304). Serially displaying the selected page images enables the document to be scanned at a speed exceeding the refresh rate of the display. The selected page images are displayed in an order, in either a forward or reverse (backward) direction.

While displaying the sequence of images, processing logic receives a user input to stop sequencing through the page images (processing block 1305).

In response to the user input, processing logic determines a location of a page image in the sequence of page images representing a point at which the user intended to stop in the sequence of page images but for display speed of the sequence of images and user reaction time in providing an indication of the point at which the user intended to stop (processing block 1306). In one embodiment, the location is selected based on visual distinctiveness of the page image at the location and the reaction time associated with the user. In another embodiment, the location is selected based on image display rate. In yet another embodiment, the location is identified based on a probability curve.

In one embodiment, processing logic rates each page in terms of its variance from other pages of the image-based document. The visual distinctiveness may be indicated, in part, by an interestingness measure. In one embodiment, processing logic computes an interestingness measure for each of a plurality of page images, identifies, independent of the distinctiveness measures, the area of successive page images using a probability curve, based on the reaction time, multiplies the interestingness measures by the probability curve, and selects the page image at the location based on this product.

In one embodiment, the interestingness measure is based on the occurrence of one or more features on each page image. In such a case processing logic rates each page in terms of its variance from other pages of the image-based document on each of the one or more features and computes a score for each page image based on a combination of scores associated with each of the one or more features. In one embodiment, processing logic computes the score for each page by multiplying the score for each feature by a feature weight and summing products associated with each of the one or more features multiplied by its associated feature weight.

The features may or may not include one or more of a group consisting of chapter headings present, section headings present, number of any pictures or graphs present, size of any pictures or graphs present, number of any tables present, size of any tables present, number of any columns present, presence of a blank area preceding a page image where the blank area is disproportionately larger than blank areas on other nearby pages. In one embodiment, each of the one or more features is weighted.

In one embodiment, processing logic ranks page images in a region that immediately surrounds and includes the page image at the location.

Once the location has been determined, processing logic automatically jumps back to the page image at the location in the sequence of page images (processing block 1307).

Note that this may be extended to any context of discontinuous navigation within any image-based information space. The user may indicate a desire to jump from the beginning of a document to a point about 80% of the way through it. Because there is no document overview or set of thumbnails to choose from, the user's indication must be considered approximate. In one embodiment, the interestingness techniques described herein will be especially useful in determining a likely target.

Indeed such a method of discovering and revealing the most visually interesting images among a set of mostly similar ones might be quite useful in document summarization or even as apparently unrelated a domain as information mining from image-based representations. It could have application in such diverse domains as video playback; information visualization; image-based document analysis; and surveillance and intelligence service (i.e., spy) systems.

Avoiding Disorientation Under Discontinuous Navigation

Using methods for estimation of reaction time and interestingness or importance of the various pages of a document, the RIF system may be able to make a reasonably good guess as to the user's intended target page and jump directly to that guess. If the guess is incorrect, the user does not know if the system has gone too far or not far enough and may need to scroll around somewhat aimlessly. Such disorientation is highly frustrating and makes for a disconcerting user experience.

A method for avoiding this disorientation is also described. The technique provides orientation clues within a rapid image flipping system when discontinuously jumping to a new location by simulating flipping through multiple images as the system approaches the new location. This helps a user of a rapid image flipping system understand any failure to jump to a user-intended location by simulating the flipping of multiple pages as the system approaches its guess of that intended location.

There are many ways to provide an overview of a document, or the location of a page amid several surrounding pages, without breaking the page flipping metaphor of the RIF user experience. A much more "natural" feeling approach is to rapidly flip back, rather than simply jumping directly back, to our target page. This avoids showing many reduced-sized images.

In one embodiment, the system shows a series of pages between our current location and the one toward which the system is backtracking. The series of images need not be started with our current location, so long as the system is reasonably sure to show any user-intended location between the current location and the target page (the system's guess as to the user's intended location).

If the user notices the page she actually intended during this backtracking feedback, she would know the system has gone too far. If not, she knows the system hasn't gone far enough, and it is easy and natural to continue navigating in the correct direction.

One problem that arises with this approach is that it may soon come to feel tedious. If a user has to wait two or three seconds for a series of page images to flash by before seeing the system's guess of the user's intended stopping point, the user will tire of the exercise. Showing several pages may be essential, since the jump-back location is a guess, which may go quite wrong. In one embodiment, because merged images of several pages can be shown, the system is able to effectively show, e.g., 31 pages in the time it can show five images by showing successively merges of, for example, 16, 8, 4, 2 and one pages. The system further enhances the naturalness of the feedback by visually simulating the appearance of page turning in the appropriate direction.

Figure 14:
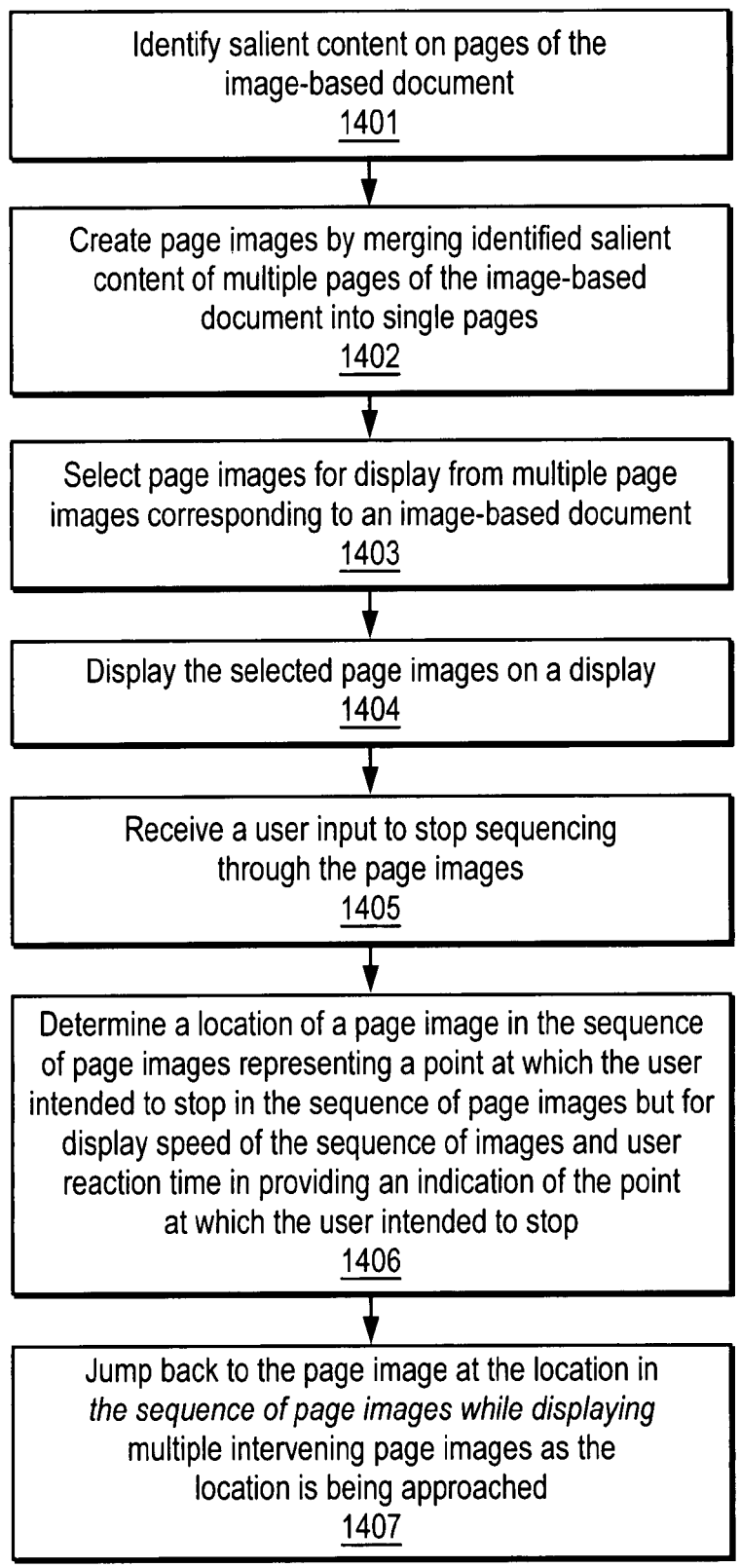
FIG. 14 is a flow diagram of still another embodiment of a process for displaying images.

FIG. 14 is a flow diagram of still another embodiment of a process for displaying images. The process is performed by processing logic that may comprise hardware (e.g., circuitry, dedicated logic, etc.), software (such as is run on a general purpose computer system or a dedicated machine), or a combination of both.

Referring to FIG. 14, the process begins by identifying salient content on pages of the image-based document (processing block 1401). In one embodiment, processing logic identifies the salient content by computing a histogram of each page of the image-based document and finding features based on information from the histogram.

After the salient content on the pages of the image-based document has been identified, processing logic creates page images by merging identified salient content of multiple pages of the image-based document into single merged pages (processing block 1402).

Once the merged pages have been created, processing logic selects page images for display from multiple page images corresponding to an image-based document (processing block 1403). The multiple page images include merged page images, and each merged page image has salient content from multiple successive page images of the image-based document merged into one image.

In one embodiment, selecting the page images for display is performed by selecting a subset of the page images based on a control information (e.g., a user input) indicative of a rate at which the selected page images are to be serially displayed. In one embodiment, the page images include a first set of merged page images having salient content from a number of page images of the image-based document merged into one image and a second set of merged page images having salient content from a different number of page images of the image-based document merged into one image. Furthermore, in one embodiment, processing logic selects the page images for display by selecting the first set of merged page images if the speed, or rate, at which the document is to be displayed is at one rate and selecting the second set of merged page images if the rate at which the document is to be displayed is at a different rate.

After selecting the page images, processing logic serially displays the selected page images on a display (processing logic 1404). Serially displaying the selected page images enables the document to be scanned at a speed exceeding the refresh rate of the display. The selected page images are displayed in an order, in either a forward or reverse (backward) direction.

While displaying the sequence of images, processing logic receives a user input to stop sequencing through the page images (processing block 1405).

In response to the user input, processing logic determines a location of a page image in the sequence of page images representing a point at which the user intended to stop in the sequence of page images (processing block 1406). In one embodiment, the location is selected based on visual distinctiveness of the page image at the location and/or the reaction time associated with the user. In another embodiment, the location is selected based on image display rate. In yet another embodiment, the location is identified based on a probability curve.

Once the location has been determined, processing logic automatically jumps back to the page image at the location in the sequence of page images while displaying multiple intervening page images as the location is being approached (processing block 1407). In one embodiment, the multiple intervening page images are located in the sequence of page images closer to the location of the page image than a location in the sequence of page images from which jumping back occurs. In one embodiment, the multiple intervening page images comprise merged images. In one embodiment, processing logic displays multiple intervening page images in a manner visually simulating the appearance of pages being turned in an appropriate direction.

An Algorithm for Computing the Visual Interestingness of Pages in a Document

One of the problems encountered by such a rapid page flipping system is stopping in an appropriate place. If the user is flipping rapidly through the pages of a document to look for a landmark found on one of the pages, that page would be no longer displayed by the time the user realizes it is time to stop and communicates that to the system. As previously described, there are several techniques that solve this problem. Mainly, when jumping to one of several rapidly displayed images, there are a number of less visually interesting pages (i.e., visually boring pages) among the few more interesting ones. Because these are more interesting, it is likely that the user wished to stop at one of them. Therefore when jumping back, the system stops at one of the pages deemed to be more interesting. Thus, the method incorporates an interestingness measure into the behavior of the page navigation system. One possible algorithm for determining the interestingness of the pages of the document is given below. In one embodiment, a set of pages is scored based on their interestingness. The interestingness refers to its salience or distinctiveness. In one embodiment, the process for ranking pages consists of two operations. The first operation analyzes each of the pages to discover the important parts of their visual structure, characterizing the page in terms of various visual features. The second part determines how different each page is from the other pages along these various dimensions. Finally, since some of the features are more important than others, the system weights each differently in determining an interestingness score for each page.

In one embodiment, the interestingness score for each page is based on visual features of the page. Thus, the system identifies features that make a page visually distinctive or a particularly good place to stop. In one embodiment, a set of properties that make a page visually distinctive include having chapter headings (large fonts, possibly centered lines), having section heading (large fonts, short lines), including user supplied annotations, having a number and size of pictures or graphs, having a number and size of tables, having a number of columns, and/or having lots of blank space on a proceeding page. Note that having a blank space on a proceeding page may indicate the beginning of a chapter or section. Thus, even though the first page of a section may not, in fact, be visually distinctive, it may be an important place to stop, and having lots of blank space may indicate that a new chapter or section is starting.

Once the features that are indicative of interestingness have been identified, software code in the system discovers these within a page image. To discover these on a particular page, page parsing or segmentation is used. There are numerous examples of such page parsing segmentation that are well known in the art. The system determines the existence (or lack thereof) of various features on each page and then computes a numerical score for the page along each dimension. Thus, for each page, the system computes the values of a "feature vector" consisting of each of these features. For example, the "picture coverage" score for a page with nothing but text might be zero, while that for a page with a large picture covering half the page might be 50. The score for a "column count" feature for most pages might be one, but a few pages might have two columns and rate a column count of 2. For existence of annotations, in one embodiment, the system determines the number of separate regions on a page in which the user has left marks.

Thus, using the feature extraction and tallying, the system computes for each feature for each page a numerical score. This feature vector then characterizes the salient visual properties of the page.

Figure 17:
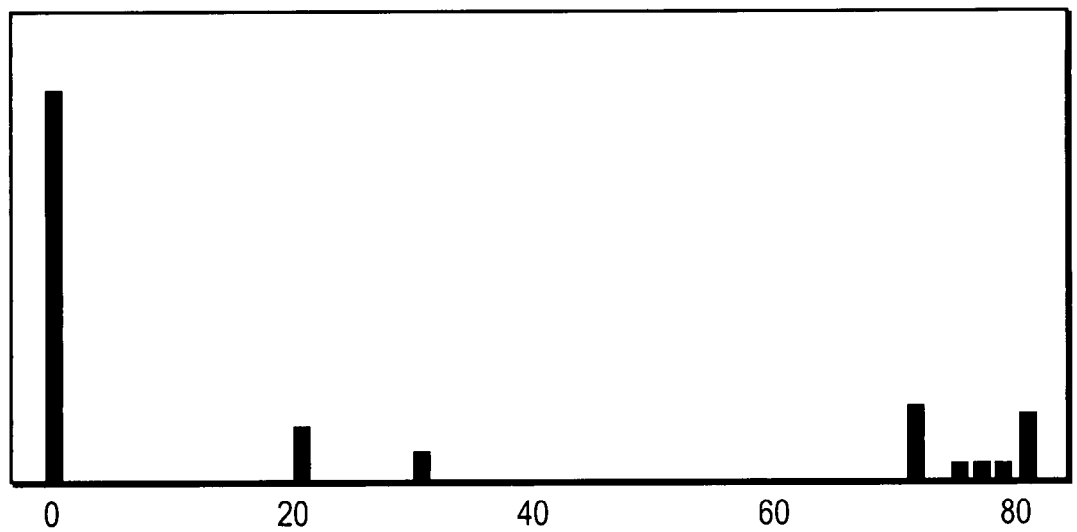
FIG. 17 illustrates a document in which most pages have no pictures and a few have large pictures.

The next phase is to perform a distinctiveness determination. In one embodiment, distinctiveness of a page depends not only on its own features, but on how those features differ from the surrounding pages. To capture that distinctiveness, the system computes a score that represents, for each feature ("dimension") how unusual the page is along this dimension. In one embodiment, this is done in two phases. First, for each dimension, the system computes a "distribution" table or histogram of the scores of all the pages along this dimension. For example, the "graphical coverage" histogram might look something like the FIG. 17, representing a document in which most pages have no pictures and a few have large pictures.

Using the representation of how the scores are distributed along a given dimension, the system calculates for each score a measure of how unusual it is. In one embodiment, the system computes for each score what percentage of all the pages are "further from the mode" than are the given score. This may be performed as follows: first, the system computes the mode (the most common score) and then for the score of interest, the system determines which side of the mode it falls on and computes how many pages have a score even more extreme (in the same direction) than a score being evaluated. This is similar to an "inverse percentile" score. In order to count it as no more extreme than scores that deviate from the mode on the other side of the mode, the score may be doubled, adding it to the tallies for each score on the other extreme until a group of identical scores that would exceed the same side total (if it is was added in) is reached. This results in a computation for each score of the number of pages having that score (along this dimension) more extreme than that score. Subtracting this from the total number of pages and dividing the result by the total number of pages provides the proportion of pages that are not more extreme than the given page. For clarity, this may be multiplied by 100 to give a percentile ranking for each score along this dimension. This will be the distinctiveness rank, along this dimension, of any page with a score.

The next phase in the process performs a weighting operation. Different features may be assigned different weights. For example, the presence of a large picture on a page is probably more salient than is a minor section heading. In one embodiment, in computing the interestingness or distinctiveness score for a page, the system doesn't simply sum up the interestingness scores along all the dimensions; they are weighted differently. Table 1 illustrates a set of weightings over the set of features that may be used.

TABLE 1

| Feature | Weight |
| --- | --- |
| number of columns | 20 |
| presence of pictures | 40 |
| blankness of previous page | 30 |
| headings | 5 |
| tables | 15 |
| unusually big lines | 5 |
| annotations | 60 |

The system multiplies the value of the feature vector by the above weights and then sums the products in order to determine the interestingness value of a page as a whole.

In one embodiment, the system produces an interesting value within a fixed range. That is, the system normalizes all scores to a range of values. In one embodiment, the range is 0 to 100. In order to normalize the scores, the system divides all the scores by the highest score and then multiplies them by the upper value of the desired range, which is 100 in one embodiment.

The following series of flow charts describes an algorithm for calculating the relative "interestingness" of each of a collection of pages of a document.

The basic scalars and data structures are:

nFeatures—the number of features we extract from the pages, upon which we will base our computation.

weights[ ]—a vector of nFeatures integers representing the relative importance of the various features.

nPages—the number of pages in the document.

page—a data structure with at least two components.

features[ ]—an array of nFeatures integers, used to hold feature "scores" for the page.

interestingness—the value we will calculate.

pages[ ]—a vector of nPages page structures.

Scoring Features

When extracting and scoring features, the page is segmented to discover its structure or the presence of various features upon which an interestingness computation is based. In one embodiment, this is performed using a Segment(page) function (not documented herein, but well-known in the art) that produces whatever data for the page is needed as input into a function that computes feature scores for the page (e.g., the ComputeFeatureValue(page, featureI) function). The output of this phase is to populate a page's features vector with the "scores" of that page for each feature.

Figure 15:
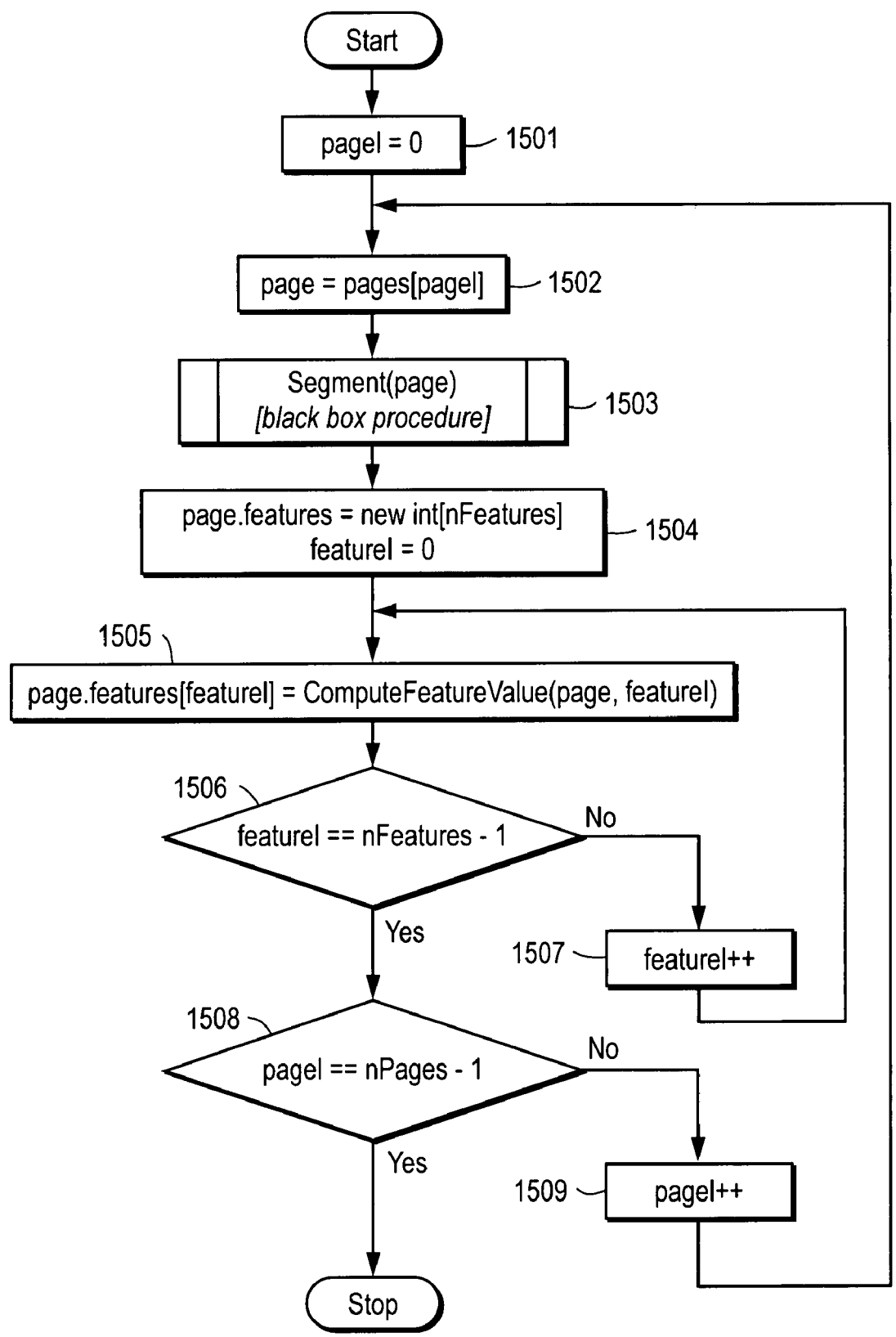
FIG. 15 is a flow diagram of one embodiment of a process for extracting and scoring features.

FIG. 15 is a flow diagram of one embodiment of a process for extracting and scoring features. The process may be performed by processing logic which may comprise hardware (e.g., circuitry, dedicated logic, etc.), software (such as is run on a general purpose computer system or a dedicated machine), or a combination of both.

Referring to FIG. 15, the process begins by processing logic setting a variable pageI equal to zero (processing block 1501) and setting a page variable equal to the value at the pageI location in a vector page[ ] of page structures for the number of pages in the document (nPages) (processing block 1502).

Next, processing logic segments the page using a segmentation process. In one embodiment, the segmentation process is performed by a Segment(page) function, which may be one of many well-known segmentation functions (processing block 1503).

After segmentation, processing logic creates a page.features vector of nFeatures integers, where nFeatures refers to the number of features that are extracted on the pages and upon which the computation of interestingness will be made (processing block 1504). This is where we will store the feature score values that will be computed for each feature of the page. Also as part of processing block 1504, processing logic sets the value of the featureI variable equal to zero.

Thereafter, processing logic sets a value at the featureI location in the page.features vector equal to the result of calling a procedure entitled ComputeFeatureValue(page,featureI) (processing block 1505). This procedure will be described in more detail below. The ComputeFeatureValue procedure maps the segmented page information to a score for the feature represented by featureI.

After performing the ComputeFeatureValue procedure and storing its result, processing logic tests whether the value of the featureI variable is yet equal to the number of features that are being computed minus one. If it is not, there are additional features to compute, and processing logic transitions to processing block 1507 and then to processing block 1505 where the score for the next feature is computed.

Once all the features on the page have been scored, processing logic checks if the pageI variable is equal to the number of pages in the document (nPages) minus one. If it is, then the process ends. If it is not, processing logic increments the value of the pageI variable (processing block 1509) and transitions to processing block 1502 for the next page in the document.

ComputeFeatureValue(page, featureI)

The purpose of the ComputeFeatureValue function is to map a raw description of the presence, absence, or amount of a certain feature on a page to a score for that feature. In one embodiment, this function relies on the presence of several other feature specific functions such as ComputeNColumnsVal(page), ComputeGraphicsVal(page), ComputeBlanknessVal(page), etc. Each of these computes a score for a specific feature. For example, the "graphics" score for a page with nothing but text might be zero, while for a page with a large picture covering half the page, the score might be 50. The score for the "nColumns" feature for most pages might be one, but a few pages might have two columns and being given a column count score of two. For existence of annotations, a determination is made as to the number of separate regions of the page in which the user has left marks.

Figure 16:
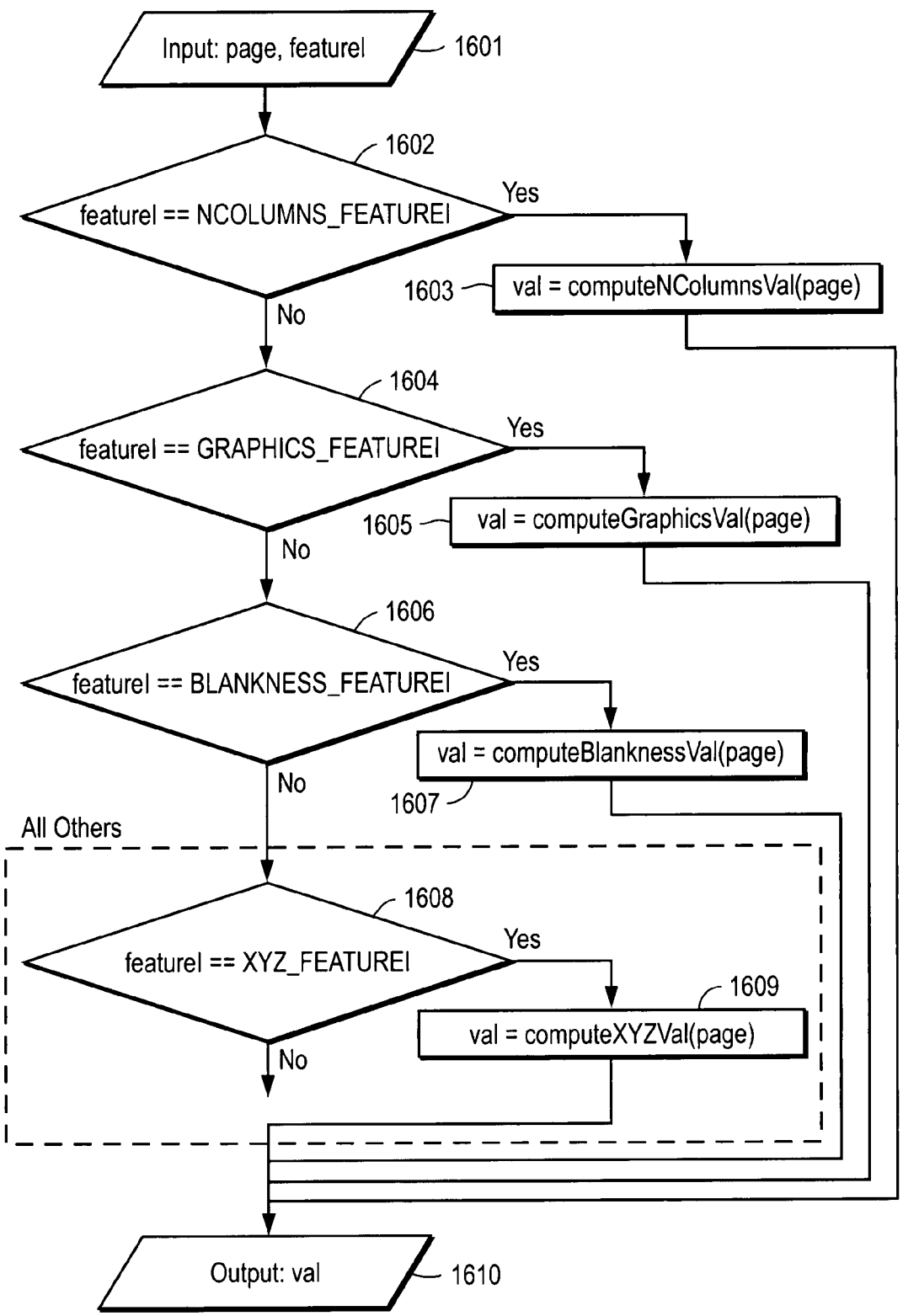
FIG. 16 is a flow diagram of one embodiment of a process for computing a feature value.

FIG. 16 is a flow diagram of one embodiment of a process for computing a feature value. The process is performed by processing logic that may comprise hardware e.g., circuitry, dedicated logic, etc.), software (such as is run on a general purpose computer system or a dedicated machine), or a combination of both.

Referring to FIG. 16, the process receives inputs of the values of the page and featureI variables (processing block 1601). Using these inputs, processing logic tests whether the value of the featureI variable equals the signature for the columns count feature (NCOLUMNS_FEATURES) (processing block 1602). If it does, processing logic sets the value of the val variable equal to the result of a function that computes a score indicative of the number of columns for the page (computeNColumnsVal(page)) and then the process outputs the value of the val variable (processing block 1610).

If the value of the featureI variable is not equal to the signature for the columns count feature, processing logic tests whether its value indicates the graphics feature (GRAPHICS_FEATURES). If so, processing logic sets the value of the val variable to the result of performing a function to compute a score for the graphic feature (ComputeGraphicsVal(page)) (processing block 1605) and the process outputs the value of the val variable (processing block 1610).

If the value of featureI does not represent the graphics feature, processing logic tests whether it corresponds to a blankness feature (processing block 1606). If so, processing logic sets the value of the val variable to the result of computing a function that computes a score for the blankness feature for the page ((ComputeBlanknessVal(page)) and outputs the value of the val variable (processing block 1310). In general, processing continues until the special computeXYZVal(page) function has been called corresponding to the given value of featureI, and its result has been returned.

Creating Distribution Tables for Each Feature

In one embodiment, the process of creating distribution tables of each function essentially creates a histogram where the x-axis is the set of all possible scores for a particular feature and the y-axis is the number of pages that exhibit that score. The result of the algorithm is a creation of two vectors: maxVals and distributions. maxVals is a vector of nFeatures integers giving for each feature the maximum score for that feature found on any page. distribution is a vector of nFeatures vectors of integers. Each distribution[i] is a vector of maxVals[i]+1 integers giving the distribution table for the i'th feature.

Figure 18:
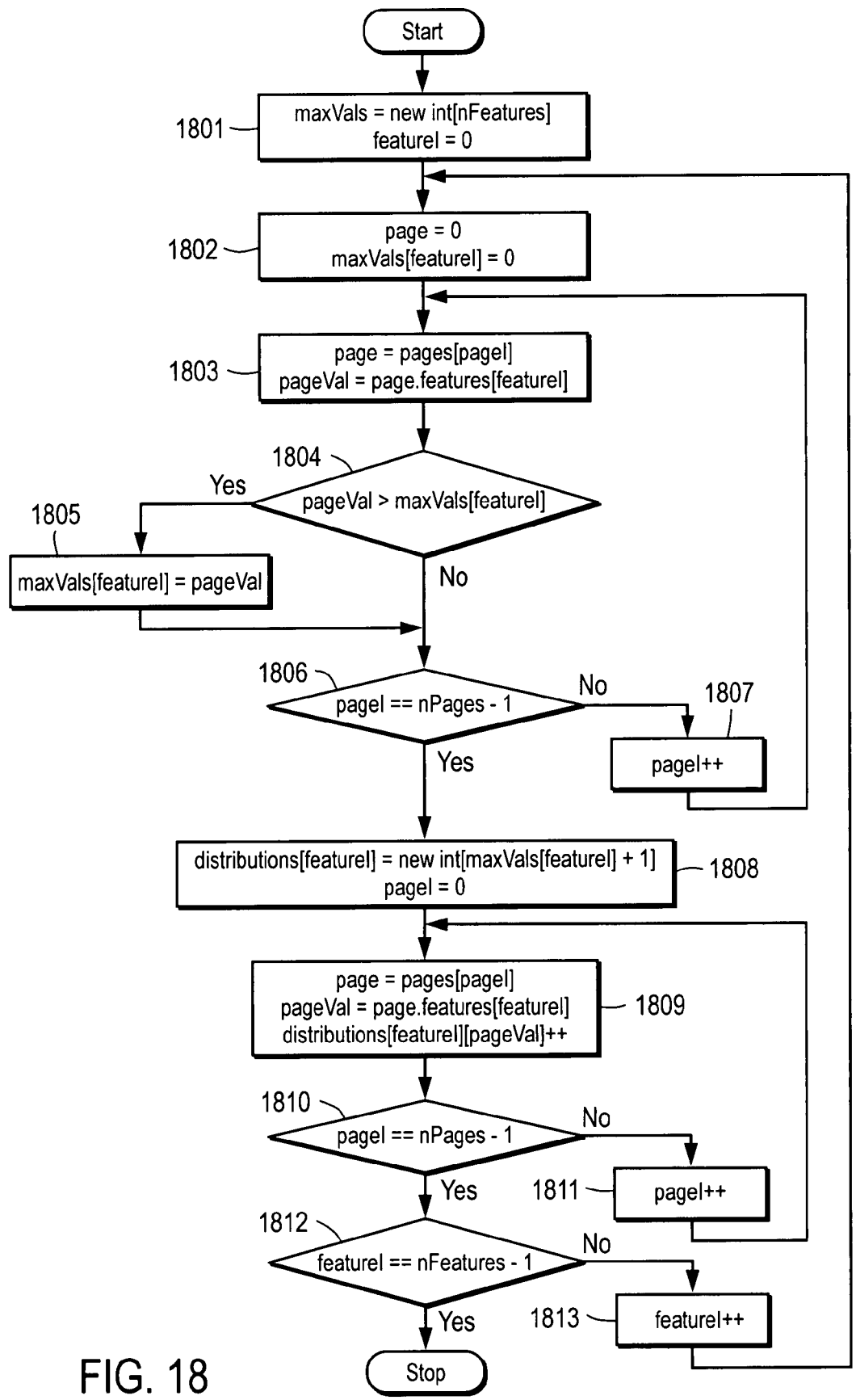
FIG. 18 is a flow diagram of one embodiment of a process for creating distribution tables for each feature.

FIG. 18 is a flow diagram of one embodiment of a process for creating distribution tables for each feature. The process is performed by processing logic which may comprise hardware (e.g., circuitry, dedicated logic, etc.), software (such as is run on a general purpose computer system or a dedicated machine), or a combination of both.

Referring to FIG. 18, the purpose of the top half of the flow chart (i.e., above processing block 1808) is to compute the maximum observed value for each feature. The process begins by processing logic creating the maxVals vector of nFeatures integers, in which we will store the maximum score for each feature and setting the value of the featureI variable equal to 0 (processing block 1801). Processing logic also sets the value of the pageI variable equal to 0 and the featureI location in the maxVals vector equal to zero (processing block 1802).

Processing logic begins computing the maximum value of each feature by setting the value of the page variable equal to the value in the pages vector at the pageI location and setting the value of the pageVal variable equal to the value at the featuresI location in pages.features vector (processing block 1803). Processing logic then tests whether the current value of the variable pageVal is greater than the maximum value encountered so far for the particular feature (maxVals[featureI]) (processing block 1804). If so, processing logic sets the maximum value vector entry for the feature equal to the page value (processing block 1805) and transitions to processing block 1806. If not, processing logic transitions directly to processing block 1806.

At processing logic 1806, processing logic tests whether the value of the pageI variable is equal to the number of pages in a document minus one. If not, processing logic increases the value of the pageI variable by one (processing block 1807) and transitions to processing block 1803 to continue with the next page. If the value of the pageI variable does equal the number of pages in the document minus one, processing logic transitions to processing block 1808.

The processing logic has now computed the maximum observed value for the given feature. At this point, the process proceeds to create the desired distribution table. At processing block 1808, processing logic creates for the given feature a vector of maxVal+1 integers and stores it at the featureI'th position in the distributions vector. (It is assumed that all values of this new vector are initialized to zero.) Processing logic also sets the value of the pageI variable to zero.

The purpose of the next loop is to tally the various scores for the given feature and store the results in the newly created distributions vector. To do so, Processing logic sets the value of page variable equal to the value in the pages vector at the location specified by the value of the pageI variable and sets the value of pageVal variable equal to the value in the page.features vector at the location indicated by the value of featureI variable. pageVal now holds this page's scores for the given feature. This occurrence of the given score is then tallied by incrementing the score's entry in the newly created vector (processing block 1809).

Thereafter, processing logic tests whether the value of the pageI variable is equal to the number of pages in the document minus one (processing block 1810). If not, processing logic increments the pageI variable by one (processing block 1811) and transitions to processing block 1809 in order to tally the score of the next page for this feature. If we have already processed the final page (pageI==nPage−1), processing logic transitions to processing logic 1812 where processing logic tests whether the value of the featureI variable is equal the number of features being considered minus one. If not, processing logic increments the value of the featureI variable by one (processing block 1813) and transitions to processing block 1802 to process the next feature. If so, the process ends.

Create Percentile Tables for Each Feature

Figure 19A:
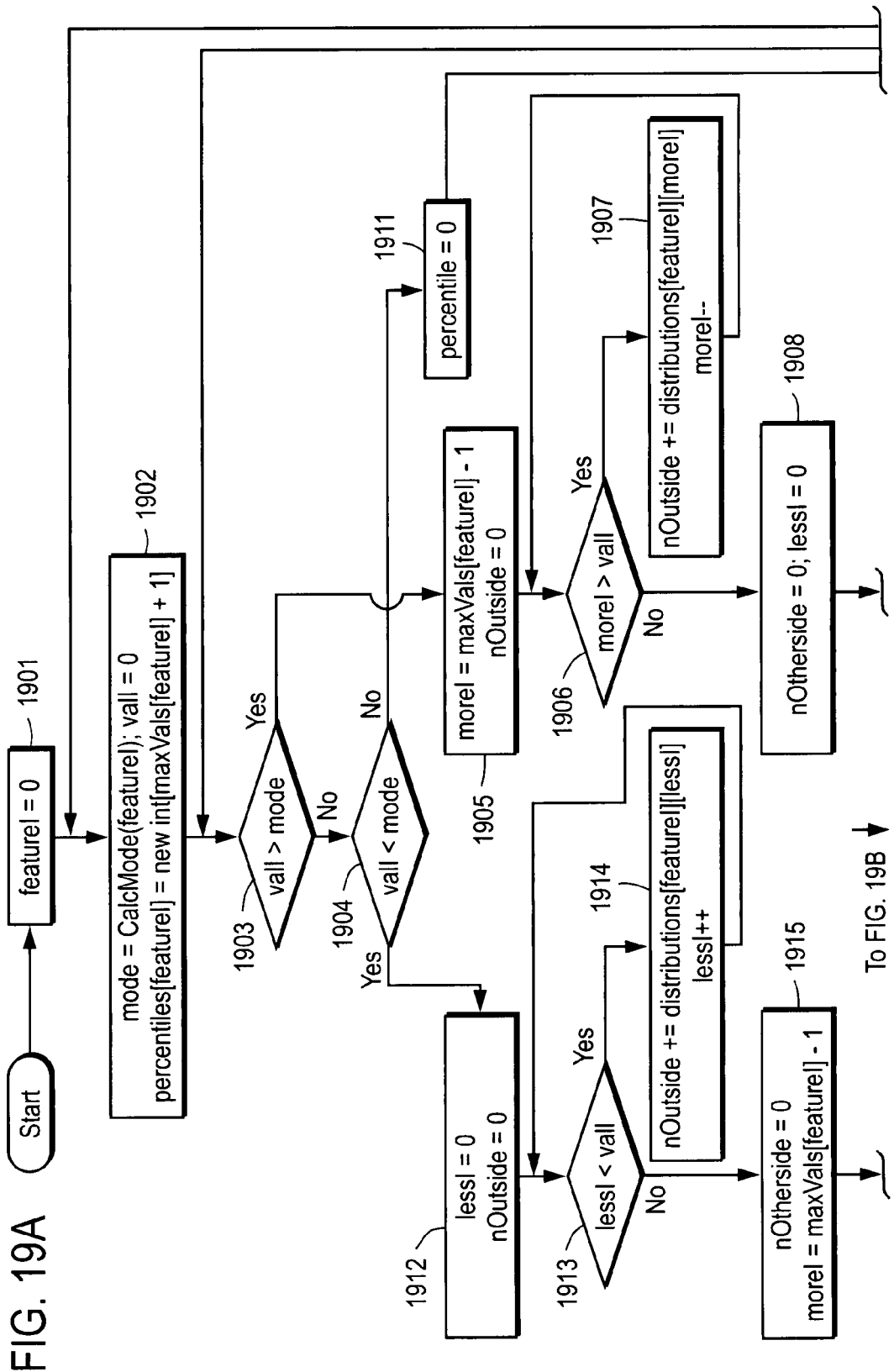
FIGS. 19A and 19B are flow diagrams of one embodiment of a process for creating percentile rankings for each score for each feature.
Figure 19B:
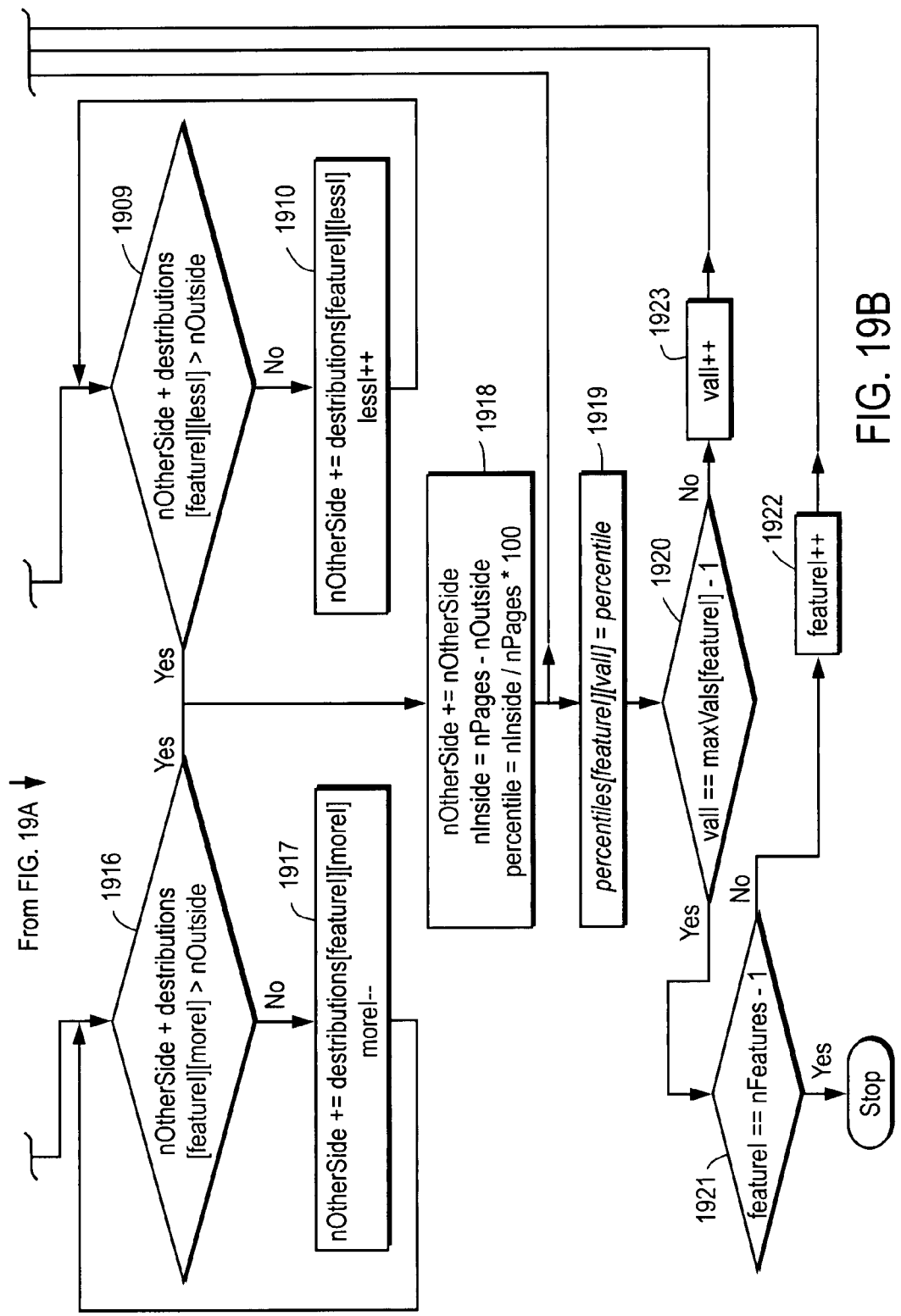

FIGS. 19A and 19B are flow diagrams of one embodiment of a process for creating percentile tables for each feature. The process is performed by processing logic that may comprise hardware e.g., circuitry, dedicated logic, etc.), software (such The process of FIGS. 19A and 19B are likely the central phase in the interestingness computation. It presupposes the prior execution of the process illustrated in FIG. 18, as it uses the maxVals and distributions tables computed thereby. For each feature, the process converts each observed score into a "percentile" ranking for that score that is intended to represent how "unusual" or "distinct" is a page that exhibits that score for that feature. The result of the process is the creation of one new vector referred to as percentiles[ ]. percentiles[ ] is a vector of nFeatures vectors of integers. Each percentiles[i] is a vector of maxVals[i]+1 integers giving the percentile rankings of all the observed scores for the i'th feature.

Referring to FIGS. 19A and 19B, the process begins by processing logic setting the value of the featureI variable equal to 0, representing the first of the visual features for which a percentile table is being calculated (processing block 1901). Two other important variables need to be described at this point. The mode variable represents the "most popular" score for the given feature, and the valI variable ranges over all the observed scores for the feature. The processing logic sets the value of the valI variable to zero (the bottom of the range of all scores). The process illustrated in FIGS. 19A and 19B presupposes the existence of a CalcMode function (illustrated in FIG. 20, and described below), which computes from the distribution vector computed in FIG. 18 the "most popular" score for any feature. The processing logic calls this function for the feature represented by featureI and sets the value of the mode variable equal to the result (CalcMode (featureI)). It then creates a new vector of integers big enough to hold all the observed scores for this feature and stores this at the featureI'th location in the percentiles vector (processing block 1902). This vector is where the percentile rankings that are being computed for each score for this feature will be stored. The central operation in this process is found in processing block 1919 in which a "percentile value" is stored for a given feature score into the vector being constructed. This percentile value is intended to represent for a given score the proportion of scores that are closer to the mode than that score. This is the meaning of the percentile variable which it is the task of most of the process to compute.

After initialization, the process begins by computing the percentile ranking of the score valI for the given feature. Any given value for valI will be greater than, less than, or equal to mode. These three cases are treated separately. First, the processing logic tests whether the value of the valI variable is greater than the value of the mode variable (processing block 1903).

If the value of valI is not greater than the value of mode, processing tests whether the value of valI is less than the value of mode (processing 1904). If not, i.e. if the two values are equal, processing logic sets the value of the percentile variable equal to 0 (meaning that no scores are closer to mode than valI), and processing transitions to processing block 1919, where processing logic records this percentile ranking (zero). If, on the other hand, the value of valI is less than that of mode, processing logic begins to count the number of pages that have even lower scores for this feature, i.e. that are even further from mode in the same direction. The nOutside variable keeps track of this count, and the processing logic initializes it to zero. The lessI variable ranges across the possible scores less than valI, and it, too, is initialized to zero (processing block 1912). Processing logic then tests whether the value of the lessI variable is (still) less than the value of the valI variable (processing block 1913). If so, processing logic increases the value of the nOutside variable by the number of pages with a score of lessI for this feature. Then processing logic increments the value of lessI, and processing returns to processing block 1913 to determine whether all the scores below valI have been covered. If so, then processing logic transitions to processing block 1915 where it begins to compute an estimate of how many page scores for this feature are more extreme than valI, but on the other (higher) side of mode. This tally is stored in the nOtherSide variable, which is initialized to 0. Another variable ranges over the higher score values (just as lessI did over the lower ones). This variable is referred to herein as moreI, and processing logic initializes it to the highest observed score, which was stored (during the first half of FIG. 18's processing) at the featureI location in the maxVals vector (processing block 1915). A goal is to determine how many high page scores are more extreme than valI. This is accomplished by counting all the highest clumps of scores (the number of pages exhibiting a certain score) until some clump of scores would, if counted, push the total beyond the number of scores that were less than valI, which has been recorded in nOutside. So processing logic tests whether the current value of the nOtherSide variable plus the size of the next clump (distributions[featureI] [moreI]) is greater than the value of nOutside (processing block 1916). If not, then processing logic increases nOtherSide by the size of that clump (distributions[featureI] [moreI]) and decrements moreI in order to consider the next lower score (processing block 1917). Processing then transitions back to processing block 1916. When a clump of pages with the same score would, if added to nOtherSide, cause it to exceed nOutside, then processing logic transitions to processing block 1918, which will be discussed later. The processing up to this point (processing blocks 1912 to 1917) has, for the case in which valI is less than mode, caused that nOutside and nOtherSide contain the number of scores more extreme than valI.

Processing blocks 1905 through 1910 accomplish the same result for the case when valI is greater than mode. These are more or less the same as blocks 1912 through 1917. The moreI variable ranges over those scores greater than valI as a total for all those page scores greater than valI is accumulated in nOutside. Then lessI ranges across some of the lowest scores until nOtherSide holds an estimate of the number of low page scores for this feature that are more extreme than valI. Finally, processing logic transitions to block 1918.

Now, in processing block 1918, the processing logic performs the central calculations of this process. The process stores the sum of nOutside and nOtherSide in the nOutside variable. This now represents the total number of pages for which the score for this feature was more extreme than valI. The higher this number, the more typical is the valI score and the more boring any page that exhibits it. Since an estimate of the interestingness of pages is being sought, rather than one of their boringness, processing logic then calculates the number of pages that have an equal or less extreme score than valI, namely nPages−nOutside, and stores this value in the variable nInside. Finally, processing logic converts this into a percentile score by dividing it by the total number of pages and multiplying by 100, and stores this value in the percentile variable (processing block 1918).

Finally, in processing block 1919, the percentile ranking for the valI score for the current feature is stored into percentiles table being computed. (Recall that percentiles[featureI] is a vector of the percentile rankings of all observed scores for the feature represented by featureI.)

The processing logic then test whether there are any more observed scores for this feature for which it needs to compute the percentile ranking by comparing valI to the maximum observed score for this feature (stored at maxVals[feature]). If so, i.e. if valI is not yet equal to maxVals[featureI]−1, processing logic increments valI and transitions to processing block 1903 to calculate the percentile ranking of the score represented by the new value of valI.

If, on the other hand, all observed scores for this feature have been considered, processing transitions to block 1921, which determines whether there are any more features to consider by comparing featureI to nFeatures−1. If there are more features (i.e. featureI is not yet equal to nFeatures−1), processing logic increments the feature index, featureI and loops back around to block 1902 to begin calculating the mode and then the percentile rankings for observed scores for the next feature. If there are no more features to consider, processing stops, having fully populated the percentiles table.

Calculate the Mode Value of a Distribution Table

Figure 20:
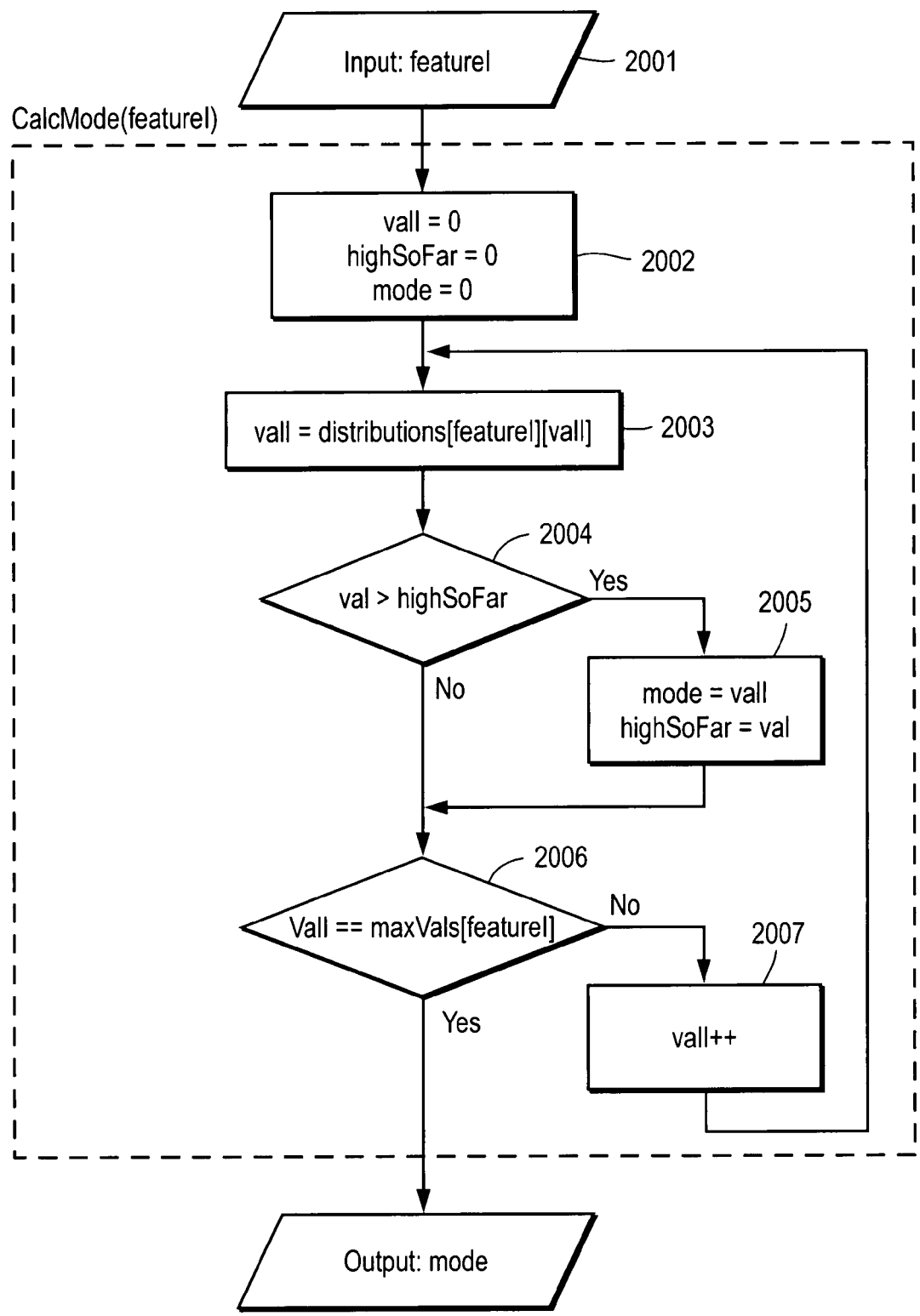
FIG. 20 is a flow diagram of one embodiment of a process for calculating the "mode," or most popular score, for each feature.

FIG. 20 is a flow diagram of one embodiment of a process for calculating the "mode" value of the distribution of a given feature. The process is performed by processing logic that may comprise hardware e.g., circuitry, dedicated logic, etc.), software (such as is run on a general purpose computer system or a dedicated machine), or a combination of both.

Referring to FIG. 20, the process begins with processing logic receiving the value of the featureI variable as an input (processing block 2001) representing the feature whose most popular score being computed. The process iterates over the observed scores for this feature and sees which has the most pages that exhibit that score. Processing logic begins by setting the value of the valI variable, which iterates over observed scores equal to 0, the value of the highSoFar variable equal to 0, and the value of the mode variable equal to 0 (processing block 2002). Processing logic then sets the value of the val variable equal to distributions[featureI][valI] which holds the tally of the number of pages that exhibit a score of valI for this feature (processing block 2003).

Processing logic tests whether the value of the val variable is greater than the value of the highSoFar variable, which is, of course, keeping track of the number of pages that exhibit the most popular score encountered so far (processing block 2004). If so, then processing logic sets the value of the mode variable equal to the value of the valI variable and sets the value of the highSoFar variable equal to the value of the val variable (processing block 2005). In any case, processing tests whether it has tested all of the observed scores by comparing the value of the valI variable to the value stored at the location in the maxVals vector specified by the value of the featureI variable (processing block 2006). If they are not equal, then processing logic increments the value of the valI variable (processing block 2007) and then processing transactions back to processing block 2003. If they are equal, the process ends with the output of the value of the mode variable, which represents the most popular score for that feature.

Figure 21:
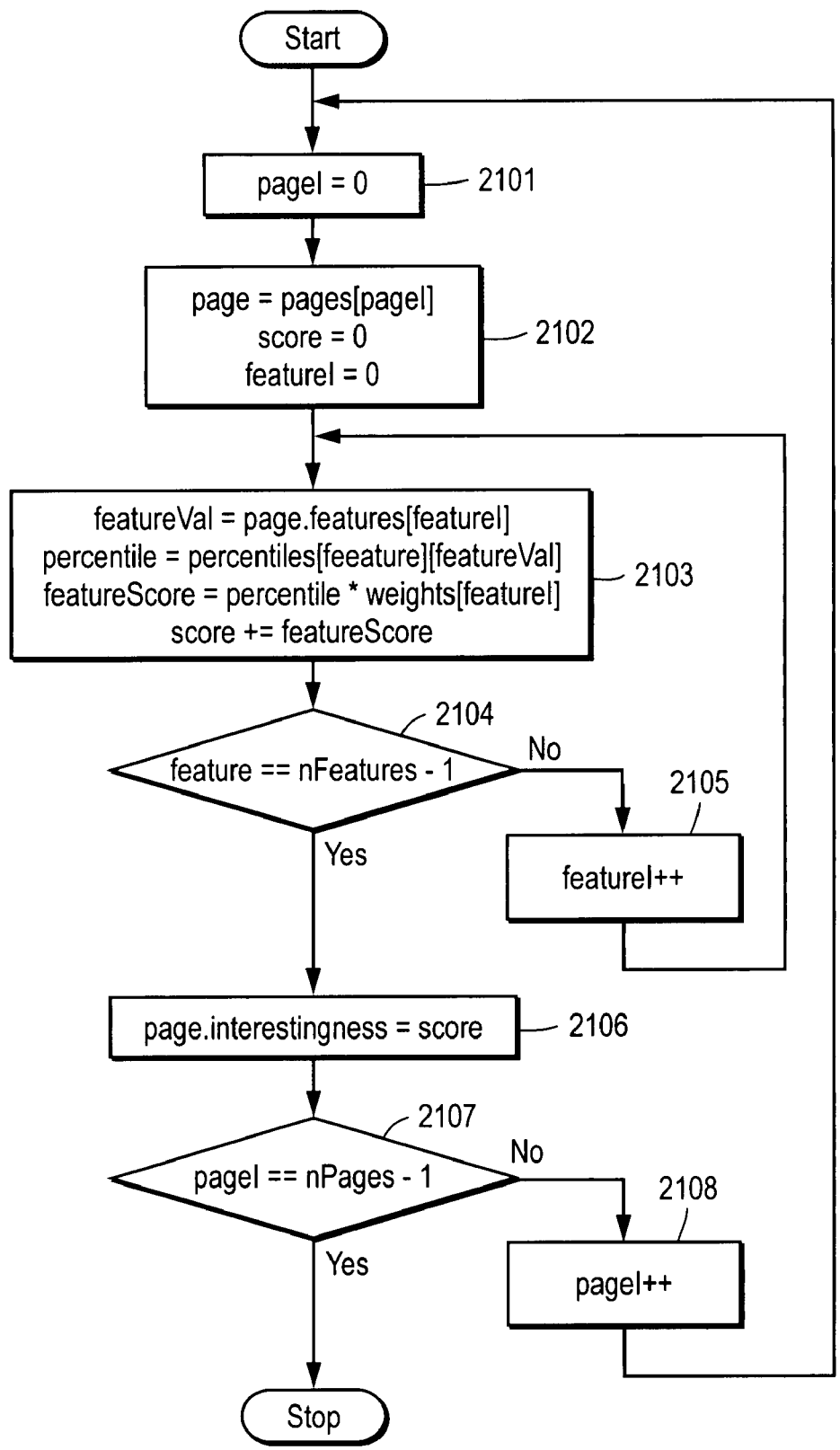
FIG. 21 is a flow diagram of one embodiment of a process for determining each page's importance.

Calculate Each Page's Importance as a Weighted Sum of Feature Distinctiveness Scores FIG. 21 is a flow diagram of one embodiment of a process for determining each page's importance. The process is performed by processing logic that may comprise hardware e.g., circuitry, dedicated logic, etc.), software (such as is run on a general purpose computer system or a dedicated machine), or a combination of both.

It will be observed that the flow diagram consists of an inner and an outer loop, where the outer loop iterates over pages, while the inner loop iterates over features to compute the interestingness score for that page.

The process combines, for each page, the distinctiveness of its various feature scores to obtain an "interestingness" score for the page as a whole. The process is simple "weighted sum" computation. Weights are assigned to each feature, and these are multiplied by the "percentile" ranking of the page's score for the given feature, with the products being summed. The result of this algorithm is the computation of the page.interestingness value.

Referring to FIG. 21, processing logic begins by setting the value of the pageI variable equal to 0 (processing block 2101) and sets the value of the page variable equal the value at the pageI location in the pages vector, the value of the score variable equal to 0, and the value of the featureI variable equal to 0 (processing block 2102).

In the main processing block, block 2103, processing logic increments the value of the score variable by the weighted value of the current feature. Processing logic sets the value of the featureVal variable to the value at the featureI location in the page.features vector representing the score for this feature on this page. Processing logic then extracts the distinctiveness value of this score from the percentiles table (perctiles[featureI]) and stores this in the percentile variable. Processing logic then weights this by multiplying it by weights[featureI] and stores this product in the featureScore variable, which it finally adds to the accumulating score variable.

Processing logic then checks whether to continue the inner loop. It tests whether the value of the featureI variable equals the value of the nFeatures variable minus one (processing block 2104). If not, processing logic increments the value of featureI variable by one (processing block 2105) and processing returns to processing block 2103. If so, then processing logic stores the pages interestingness score by setting the value of the page.interestingness variable equal to the value of the score variable (processing block 2106). Processing logic then checks whether to continue the outer loop. It tests whether the value of the pageI variable equals the value of the nPages variable minus one (processing block 2107). If not, then processing logic increments the value of the pageI variable by one (processing block 2108) and processing logic returns to processing block 2101. If so, then the process ends.

Normalize All the Page Interestingness Scores

In one embodiment, all of the page.interestingness values are in a predictable range. An algorithm is described below that ensures that all of the page.interestingness values will fall between 0 and 100.

Figure 22:
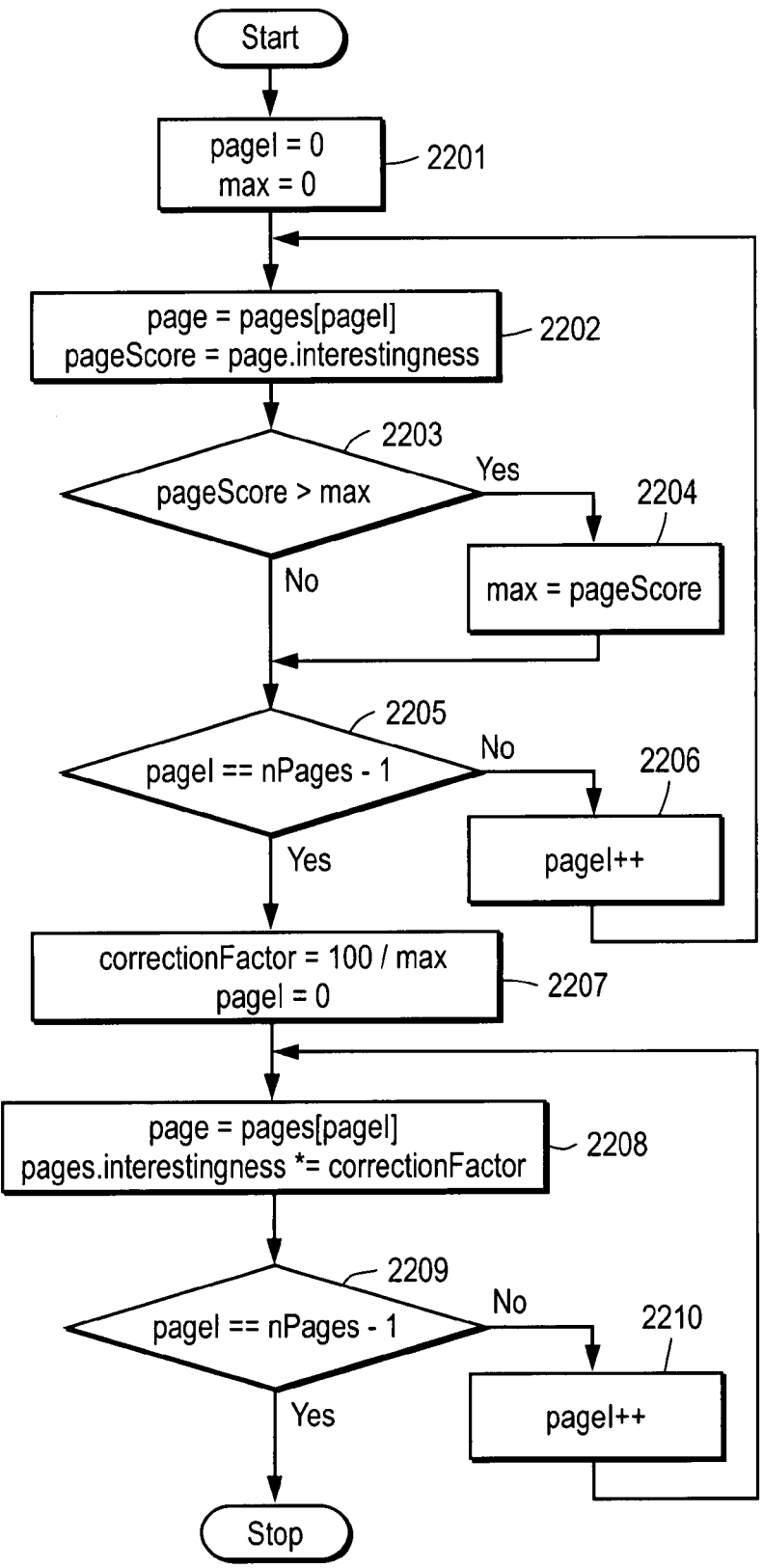
FIG. 22 is a flow diagram of one embodiment of a normalization process.

FIG. 22 is a flow diagram of one embodiment of a normalization process. The process is performed by processing logic that may comprise hardware e.g., circuitry, dedicated logic, etc.), software (such as is run on a general purpose computer system or a dedicated machine), or a combination of both.

The process described by FIG. 22 contains two loops. The first calculates a maximum page interestingness score which it stores in the max variable. The second arranges that all interestingness scores are scaled to fall in the range between 0 and 100.

Referring to FIG. 22, processing logic begins by setting the value of the pageI and max variables equal to 0 (processing block 2201). Processing then sets the value of the page variable equal to the value at the pageI location in the pages vector and sets the value of the pageScore variable equal to the value of the page.interestingness variable (processing block 2202).

Processing logic then tests whether the value of the pageScore variable is greater than the value of the max variable (processing block 2203). If so, then processing logic sets the value of the max variable equal to the value of the pageScore variable (processing block 2204). Next, processing logic tests whether it has finished iterating through all the pages by testing whether the value of the pageI variable is equal to the value of the nPages variable minus one (processing block 2205). If not, processing logic increments the value of the pageI variable by one (processing block 2206) and processing transitions back to processing block 2202.

If all the pages have been examined for their score (pageI==nPages−1), processing logic proceeds to initialize two variables preparatory to the second loop. A correction factor is calculated which, when multiplied by the page interestingness scores will scale them all to fit within the range 0 to 100, and this is stored in the correctionFactor variable. In one embodiment, this correction factor is computed by dividing 100 by the maximum observed interestingness score, which was calculated by the first loop and stored in the variable max. The pageI variable is then set to 0, in order to begin iterating through the pages again (processing block 2207).

In processing block 2208, processing logic scales the current page's overall interestingness score by the correction factor as follows. The current page's data structure is extracted from the pages vector and stored into the page variable (page=pages[pageI]). The interestingness score is multiplied by the correction factor and the product is stored back into the interestingness field of the data structure (page.interestingness*=correctionFactor).

Processing logic then tests whether it has yet iterated through all the pages performing this scaling operation by testing whether pageI==nPages−1. If not, it increments the page index variable, pageI and returns to processing block 2208. If so, the process is complete.

An Exemplary Computer System

Figure 23:
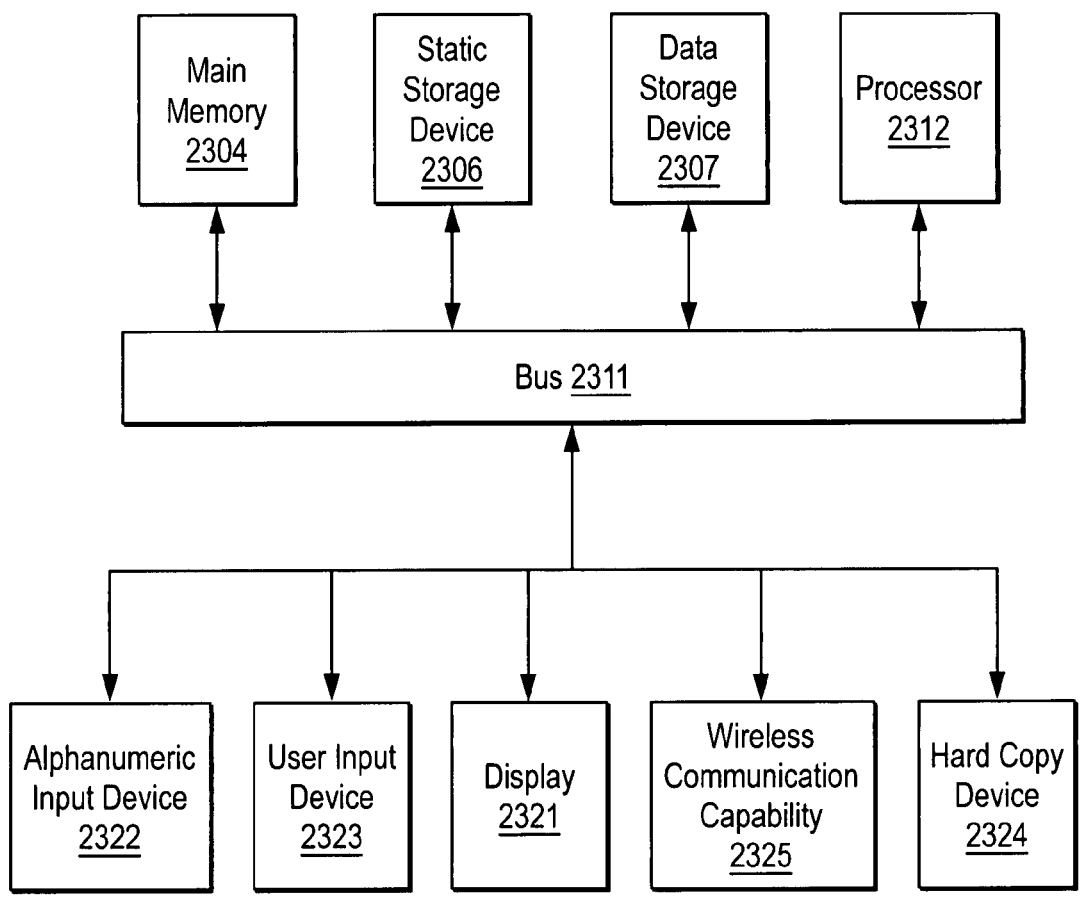
FIG. 23 is a block diagram of an exemplary computer system that may perform one or more of the operations.

FIG. 23 is a block diagram of an exemplary computer system that may perform one or more of the operations described herein. Referring to FIG. 23, the computer system may comprise an exemplary client or server computer system. The computer system comprises a communication mechanism or bus 2311 for communicating information, and a processor 2312 coupled with bus 2311 for processing information. Processor 2312 includes a microprocessor, but is not limited to a microprocessor, such as, for example, Pentium™, PowerPC™, Alpha™, etc.

The computer system further comprises a random access memory (RAM), or other dynamic storage device 2304 (referred to as main memory) coupled to bus 2311 for storing information and instructions to be executed by processor 2312. Main memory 2304 also may be used for storing temporary variables or other intermediate information during execution of instructions by processor 2312.

The computer system also comprises a read only memory (ROM) and/or other static storage device 2306 coupled to bus 2311 for storing static information and instructions for processor 2312, and a data storage device 2307, such as a magnetic disk or optical disk and its corresponding disk drive. Data storage device 2307 is coupled to bus 2311 for storing information and instructions.

The computer system may further be coupled to a display device 2321, such as a cathode ray tube (CRT) or liquid crystal display (LCD), coupled to bus 2311 for displaying information to a computer user. An alphanumeric input device 2322, including alphanumeric and other keys, may also be coupled to bus 2311 for communicating information and command selections to processor 2312. An additional user input device is cursor control 2323, such as a mouse, trackball, trackpad, stylus, or cursor direction keys, coupled to bus 2311 for communicating direction information and command selections to processor 2312, and for controlling cursor movement on display 2321.

Another device that may be coupled to bus 2311 is hard copy device 2324, which may be used for printing instructions, data, or other information on a medium such as paper, film, or similar types of media. Furthermore, a sound recording and playback device, such as a speaker and/or microphone may optionally be coupled to bus 2311 for audio interfacing with the computer system. Another device that may be coupled to bus 2311 is a wired/wireless communication capability 2325 to communication to a phone or handheld palm device.

Note that any or all of the components of the computer system 2300 and associated hardware may be used in the present invention. For example, in one embodiment, a joystick or shuttlewheel device for generating directional and intensity control signals is included. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   determining, by a display module of a processor, a rate at which an image-based document is to be displayed, the image-based document including a plurality of page images;
   selecting, by the display module, a first set of merged page images if the rate at which the document is to be displayed is at a first rate, wherein the first set of merged page images comprises salient content from a first number of page images of the image-based document merged into one image;
   selecting, by the display module, a second set of merged page images if the rate at which the document is to be displayed is at a second rate, wherein the second set of merged page images comprises salient content from a second number of page images of the image-based document merged into one image, the second number being different from the first number; and
   serially displaying, by the display module, the selected page images on a display.

2. The method defined in claim 1 wherein selecting the page images for display comprises selecting a subset of the plurality of pages images based on a control information indicative of a rate at which the selected page images are to be serially displayed.

3. The method defined in claim 2 wherein serially displaying the selected page images enables the document to be scanned at a speed exceeding a refresh rate of the display.

4. The method defined in claim 1 further comprising:
   identifying salient content on pages of the image-based document; and
   creating the plurality of page images by merging identified salient content of multiple pages of the image based document into single images.

5. The method defined in claim 4 wherein creating the plurality of pages comprises:
   creating the first set of merged;
   creating the second set of merged pages, the second number being a multiple of the first number;
   creating a third set of merged pages having salient content from a third number of page images of the image-based document merged into one image, the third number being a multiple of the second number; and selecting one of the first, second or third sets based on a speed control input.

6. The method defined in claim 4 wherein identifying the salient content comprises:
computing a histogram of each page of the image-based document; and
finding features based on information from the histogram.

7. The method defined in claim 6 wherein finding the features comprises one or more of:
finding lineheights and separations;
finding headers;
finding footers;
finding columnation;
finding blank areas;
finding tables;
finding graphical images; and
finding text areas.

8. The method defined in claim 6 wherein finding the features comprises analyzing text to identify one or more of a group consisting of headings, boldness, justification, centering, line height, line separation and indentation.

9. The method defined in claim 6 wherein merging identified salient content of multiple pages of the image-based document into single pages comprises:
adding overlapping salient content from two or more pages to a single page image in decreasing size order.

10. The method defined in claim 6 wherein merging identified salient content of multiple pages of the image-based document into single pages comprises:
adding overlapping salient content from two or more pages to a single page image in an order with increasing transparency as each one of the overlapping salient content is added.

11. The method defined in claim 6 wherein merging identified salient content of multiple pages of the image-based document into single pages comprises adding text to a single page image resulting from merging two or more pages, the added text being a version of original text from one of the two or more pages that has been modified to display differently than the original text.

12. The method defined in claim 1 wherein page images are displayed, as a function of an input control, according to a merge level indicative of a number of pages of the image-based document per merged image and a rate indicative of the number of merged page images per second based on the merge level.

13. The method defined in claim 12 wherein the page images are displayed in order forward or backward based on a direction indication.

14. The method defined in claim 12 wherein the merge level and the rate are set as a function of the input control and the size of the image-based document.

15. The method defined in claim 1 wherein serially displaying the selected page images on the display comprises displaying the selected page images in an order either forward or backward, and further comprising jumping back to one or more selected page images based on the input control.

16. The method defined in claim 15 wherein jumping back to one or more selected page images comprises jumping back to a page image based on an interestingness measure associated with the page image.

17. An article of manufacture comprising a machine-readable storage medium storing instructions thereon which, when executed by a system, causes the system to perform a method comprising:

determining a rate at which an image-based document is to be displayed, the image-based document including a plurality of page images;

selecting a first set of merged page images if the rate at which the document is to be displayed is at a first rate, wherein the first set of merged page images comprises salient content from a first number of page images of the image-based document merged into one image;

selecting a second set of merged page images if the rate at which the document is to be displayed is at a second rate, wherein the second set of merged page images comprises salient content from a second number of page images of the image-based document merged into one image, the second number being different from the first number; and serially displaying the selected page images on a display.

18. The article of manufacture defined in claim 17 wherein selecting the page images for display comprises selecting a subset of the plurality of pages images based on a control information indicative of a rate at which the selected page images are to be serially displayed.

19. The article of manufacture defined in claim 18 wherein serially displaying the selected page images enables the document to be scanned at a speed exceeding a refresh rate of the display.

20. The article of manufacture defined in claim 17 wherein the method further comprises:
identifying salient content on pages of the image-based document; and
creating the plurality of page images by merging identified salient content of multiple pages of the image based document into single images.

21. The article of manufacture defined in claim 20 wherein creating the plurality of pages comprises:
creating the first set of merged;
creating the second set of merged pages, the second number being a multiple of the first number;
creating a third set of merged pages having salient content from a third number of page images of the image-based document merged into one image, the third number being a multiple of the second number; and
selecting one of the first, second or third sets based on a speed control input.

22. The article of manufacture defined in claim 20 wherein identifying the salient content comprises:
computing a histogram of each page of the image-based document; and
finding features based on information from the histogram.

23. The article of manufacture defined in claim 22 wherein finding the features comprises one or more of:
finding lineheights and separations;
finding headers;
finding footers;
finding columnate;
finding blank areas;
finding tables;
finding graphical images; and
finding text areas.

24. The article of manufacture defined in claim 22 wherein finding the features comprises analyzing text to identify one or more of a group consisting of headings, boldness, indentation, justification, centering, line heights and line separations.

25. The article of manufacture defined in claim 22 wherein merging identified salient content of multiple pages of the image-based document into single pages comprises:

adding overlapping salient content from two or more pages to a single page image in decreasing size order.

26. The article of manufacture defined in claim 22 wherein merging identified salient content of multiple pages of the image-based document into single pages comprises:

adding overlapping salient content from two or more pages to a single page image in an order with increasing transparency as each one of the overlapping salient content is added.

27. The article of manufacture defined in claim 22 wherein merging identified salient content of multiple pages of the image-based document into single pages comprises adding text to a single page image resulting from merging two or more pages, the added text being a version of original text from one of the two or more pages that has been modified to display differently than the original text.

28. The article of manufacture defined in claim 17 wherein page images are displayed, as a function of an input control, according to a merge level indicative of a number of pages of the image-based document per merged image and a rate indicative of the number of merged page images per second based on the merge level.

29. The article of manufacture defined in claim 28 wherein the page images are displayed in order forward or backward based on a direction indication.

30. The article of manufacture defined in claim 28 wherein the merge level and the rate are set as a function of the input control and the size of the image-based document.

31. The article of manufacture defined in claim 17 wherein serially displaying the selected page images on the display comprises displaying the selected page images in an order either forward or backward, and wherein the method further comprises jumping back to one or more selected page images based on the input control.

32. The article of manufacture defined in claim 31 wherein jumping back to one or more selected page images comprises jumping back to a page image based on an interestingness measure associated with the page image.

* * * * *